(12) United States Patent
Seok

(10) Patent No.: US 9,749,971 B2
(45) Date of Patent: Aug. 29, 2017

(54) TRANSMISSION POWER CONTROL FOR DEVICE IN HIGH EFFICIENCY WIRELESS LAN

(71) Applicant: NEWRACOM, INC., Irvine, CA (US)

(72) Inventor: Yongho Seok, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 62 days.

(21) Appl. No.: 14/823,356

(22) Filed: Aug. 11, 2015

(65) Prior Publication Data

US 2016/0050634 A1 Feb. 18, 2016

Related U.S. Application Data

(60) Provisional application No. 62/069,206, filed on Oct. 27, 2014.

(30) Foreign Application Priority Data

Aug. 12, 2014 (KR) ........................ 10-2014-0104230

(51) Int. Cl.
| | |
|---|---|
| *H04W 4/00* | (2009.01) |
| *H04W 52/36* | (2009.01) |
| *H04W 52/14* | (2009.01) |
| *H04W 84/12* | (2009.01) |
| *H04W 52/28* | (2009.01) |

(52) U.S. Cl.
CPC ....... *H04W 52/367* (2013.01); *H04W 52/146* (2013.01); *H04W 52/281* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2008/0056177 A1* | 3/2008 | Mori | ..................... | H04W 52/04 370/318 |
| 2011/0002279 A1* | 1/2011 | Yang | ..................... | H04L 12/66 370/329 |
| 2011/0111766 A1* | 5/2011 | Yang | ................... | H04W 52/241 455/452.2 |
| 2013/0286948 A1* | 10/2013 | Gao | ..................... | H04W 52/146 370/328 |

(Continued)

*Primary Examiner* — Michael J Moore, Jr.

(57) ABSTRACT

The present invention relates to transmission power control for a device operating in a Wireless Local Area Network (WLAN) system, and a transmission and reception method and apparatus using the transmission power control. According to an aspect of the present invention, a method for transmitting an uplink frame to an Access Point (AP) by a Station (STA) in a WLAN system may include receiving first transmission power control information and second transmission power control information from the AP, if a type related to the uplink frame is a first type, determining a maximum transmission power based on the first transmission power control information, if the type related to the uplink frame is a second type, determining a maximum transmission power based on the second transmission power control information, and transmitting the uplink frame based on the determined maximum transmission power. The first type and the second type may correspond to different access schemes for uplink transmission.

18 Claims, 24 Drawing Sheets

(56) References Cited

U.S. PATENT DOCUMENTS

| | | | |
|---|---|---|---|
| 2015/0031410 A1* | 1/2015 | Lim | H04W 52/146 455/522 |
| 2015/0085716 A1* | 3/2015 | Zhang | H04W 52/146 370/280 |
| 2016/0029239 A1* | 1/2016 | Sadeghi | H04W 24/10 370/252 |
| 2016/0066288 A1* | 3/2016 | Feng | H04W 52/54 370/280 |
| 2016/0081036 A1* | 3/2016 | Luo | H04W 52/343 370/329 |
| 2016/0142122 A1* | 5/2016 | Merlin | H04B 7/0617 375/267 |

* cited by examiner

FIG. 10

| L-STF | L-LTF | L-SIG | HE-SIG-A | HE-STF | HE-LTF | HE-LTF | HE-LTF | HE-LTF | HE-SIG-B | PSDU(AP to STA6) |
| | | | | HE-STF | HE-LTF | HE-LTF | HE-LTF | HE-LTF | HE-SIG-B | PSDU(AP to STA5) |
| | | | | HE-STF | HE-LTF | HE-LTF | HE-LTF | HE-LTF | HE-SIG-B | PSDU(AP to STA3,STA4) |
| | | | | HE-STF | HE-LTF | HE-LTF | HE-LTF | HE-LTF | HE-SIG-B | PSDU(AP to STA1,STA2) |

FIG. 11

| L-STF | L-LTF | L-SIG | HE-SIG-A | HE-STF | HE-LTF | HE-SIG-B | HE-LTF | HE-LTF | HE-LTF | HE-LTF | HE-SIG-C | PSDU(AP to STA6) |
| | | | | HE-STF | HE-LTF | HE-SIG-B | HE-LTF | HE-LTF | HE-LTF | HE-LTF | HE-SIG-C | PSDU(AP to STA5) |
| | | | | HE-STF | HE-LTF | HE-SIG-B | HE-LTF | HE-LTF | HE-LTF | HE-LTF | HE-SIG-C | PSDU(AP to STA3,STA4) |
| | | | | HE-STF | HE-LTF | HE-SIG-B | HE-LTF | HE-LTF | HE-LTF | HE-LTF | HE-SIG-C | PSDU(AP to STA1,STA2) |

FIG. 14

| L-STF | L-LTF | L-SIG | HE-SIG-A | HE-STF | HE-LTF | HE-SIG-B | HE-LTF | HE-LTF | HE-LTF | HE-LTF | HE-SIG-C | PSDU(STA4 to AP) |
|---|---|---|---|---|---|---|---|---|---|---|---|---|
| | | | | HE-STF | HE-LTF | HE-SIG-B | HE-LTF | HE-LTF | HE-LTF | HE-LTF | HE-SIG-C | PSDU(STA3 to AP) |
| | | | | HE-STF | HE-LTF | HE-SIG-B | HE-LTF | HE-LTF | HE-LTF | HE-LTF | HE-SIG-C | PSDU(STA2 to AP) |
| | | | | HE-STF | HE-LTF | HE-SIG-B | HE-LTF | HE-LTF | HE-LTF | HE-LTF | HE-SIG-C | PSDU(STA1 to AP) |

FIG. 16

| Element ID | Length | Transmit Power Information | Local Maximum Transmit Power for 20MHz | Local Maximum Transmit Power for 40MHz | Local Maximum Transmit Power for 80MHz | Local Maximum Transmit Power for 160/80+80MHz |
|---|---|---|---|---|---|---|
| 1 octet | 1 octet | 1 octet | 1 octet | 1 octet | 1 octet | 1 octet |

FIG. 19

| |  |
|---|---|
| HE PPDU (5MHz)<br>Output Power = 62.5mW<br>PSD = 11dBm | STA4 to AP |
| HE PPDU (5MHz)<br>Output Power = 62.5mW<br>PSD = 11dBm | STA3 to AP |
| HE PPDU (5MHz)<br>Output Power = 62.5mW<br>PSD = 11dBm | STA2 to AP |
| HE PPDU (5MHz)<br>Output Power = 62.5mW<br>PSD = 11dBm | STA1 to AP |

Multiple Transmitter Tx

FIG. 21

| Element ID | Length | Frequency Segment Index | Local Maximum Transmit Power for A MHz | Local Maximum Transmit Power for B MHz | Local Maximum Transmit Power for C MHz | Local Maximum Transmit Power for D MHz | Local Maximum Transmit Power for E MHz | Local Maximum Transmit Power for F MHz |
|---|---|---|---|---|---|---|---|---|
| 1 octet | 1 octet | 1 octet | 1 octet | 1 octet | 1 octet | 1 octet | 1 octet | 1 octet |

<--- Repeated for each frequency segments --->

TRANSMISSION POWER CONTROL FOR DEVICE IN HIGH EFFICIENCY WIRELESS LAN

This application claims the benefit of Korean Patent Application No. 10-2014-0104230, filed on Aug. 12, 2014, which is hereby incorporated by reference as if fully set forth herein. This application claims the benefit of U.S. Provisional Application No. 62/069,206, filed on Oct. 27, 2014, which is hereby incorporated by reference as if fully set forth herein.

BACKGROUND OF THE INVENTION

Field of the Invention

The present invention relates to a Wireless Local Area Network (WLAN), and more particularly, to transmission power control for a device operating in a High Efficiency WLAN (HEW), a transmitting method, receiving method, transmitting apparatus, receiving apparatus, and software using the transmission power control, and a recording medium that stores the software.

Discussion of the Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

SUMMARY OF THE INVENTION

Objects of the present invention is to provide a new method and apparatus for controlling the transmission power of a device operating in a High Efficiency WLAN (HEW).

The objects of the present invention are not limited to the foregoing descriptions, and additional objects will become apparent to those having ordinary skill in the pertinent art to the present invention based upon the following descriptions.

In an aspect of the present invention, a method for transmitting an uplink frame to an Access Point (AP) by a Station (STA) in a WLAN system may be provided. The method may include receiving first transmission power control information and second transmission power control information from the AP, if a type related to the uplink frame is a first type, determining a maximum transmission power based on the first transmission power control information, if the type related to the uplink frame is a second type, determining a maximum transmission power based on the second transmission power control information, and transmitting the uplink frame based on the determined maximum transmission power. The first type and the second type may correspond to different access schemes for uplink transmission.

In another aspect of the present invention, a method for receiving an uplink frame from a plurality of STAs by an AP in a WLAN system may be provided. The method may include transmitting first transmission power control information and second transmission power control information to the plurality of STAs, if a type related to the uplink frame is a first type, receiving the uplink frame from one STA according to a maximum transmission power determined based on the first transmission power control information, and if the type related to the uplink frame is a second type, receiving the uplink frame from the plurality of STAs according to a maximum transmission power determined based on the second transmission power control information. The first type and the second type may correspond to different access schemes for uplink transmission.

In another aspect of the present invention, an STA apparatus for transmitting an uplink frame to an AP may be provided. The STA apparatus may include a baseband process, a Radio Frequency (RF) transceiver, a memory, etc. The baseband processor may be configured to receive first transmission power control information and second transmission power control information from the AP using the RF transceiver, to determine, if a type related to the uplink frame is a first type, a maximum transmission power based on the first transmission power control information, to determine, if the type related to the uplink frame is a second type, a maximum transmission power based on the second transmission power control information, and to transmit the uplink frame based on the determined maximum transmission power using the RF transceiver. The first type and the second type may correspond to different access schemes for uplink transmission.

In another aspect of the present invention, an AP apparatus for receiving an uplink frame from a plurality of STAs in a WLAN system may be provided. The AP apparatus may include a baseband processor, an RF transceiver, a memory, etc. The baseband processor may be configured to transmit first transmission power control information and second transmission power control information to the plurality of STAs using the RF transceiver, to receive, if a type related to the uplink frame is a first type, the uplink frame from one STA according to a maximum transmission power determined based on the first transmission power control information using the RF transceiver, and to receive, if the type related to the uplink frame is a second type, the uplink frame from the plurality of STAs according to a maximum transmission power determined based on the second transmission power control information using the RF transceiver. The first type and the second type may correspond to different access schemes for uplink transmission.

In another aspect of the present invention, a software or computer-readable medium having instructions executable for an STA apparatus to transmit an uplink frame to an AP in a WLAN system may be provided. The executable instructions may operate the STA apparatus to receive first transmission power control information and second transmission power control information from the AP, to determine, if a type related to the uplink frame is a first type, a maximum transmission power based on the first transmission power control information, to determine, if the type related to the uplink frame is a second type, a maximum transmission power based on the second transmission power control information, and to transmit the uplink frame based on the determined maximum transmission power. The first type and the second type may correspond to different access schemes for uplink transmission.

In another aspect of the present invention, a software or computer-readable medium having instructions executable for an AP apparatus to receive an uplink frame from a plurality of STAs in a WLAN system may be provided. The executable instructions may operate the AP apparatus to transmit first transmission power control information and second transmission power control information to the plurality of STAs, to receive, if a type related to the uplink frame is a first type, the uplink frame from one STA according to a maximum transmission power determined based on the first transmission power control information, and to receive, if the type related to the uplink frame is a second type, the uplink frame from the plurality of STAs according to a maximum transmission power determined based on the second transmission power control information. The first type and the second type may correspond to different access schemes for uplink transmission.

It is to be understood that both the foregoing summarized features are exemplary aspects of the following detailed description of the present invention without limiting the scope of the present invention.

According to the present invention, a new method and apparatus for controlling the transmission power of a device operating in a HEW can be provided.

The advantages of the present invention are not limited to the foregoing descriptions, and additional advantages will become apparent to those having ordinary skill in the pertinent art to the present invention based upon the following descriptions.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

The accompanying drawings, which are included to provide a further understanding of the invention and are incorporated in and constitute a part of this application, illustrate embodiment(s) of the invention and together with the description serve to explain the principle of the invention. In the drawings:

FIG. 10 depicts the starting and ending points of an High Efficiency Long Training Field (HE-LTF) field in a HE PPDU frame format according to the present invention;

FIG. 11 depicts a High Efficiency SIGnal B (HE-SIG-B) field and a High Efficiency SIGnal C (HE-SIG-C) field in the HE PPDU frame format according to the present invention;

FIG. 14 depicts another exemplary HE PPDU frame format according to the present invention;

FIG. 16 illustrates a format of a Very High Throughput (VHT) Transmit Power Envelope element;

FIG. 19 depicts transmission power control for multiple transmitter transmission according to the present invention;

FIG. 21 illustrates a format of a HE Transmit Power Envelope element according to the present invention;

DETAILED DESCRIPTION OF THE INVENTION

Figure 1:
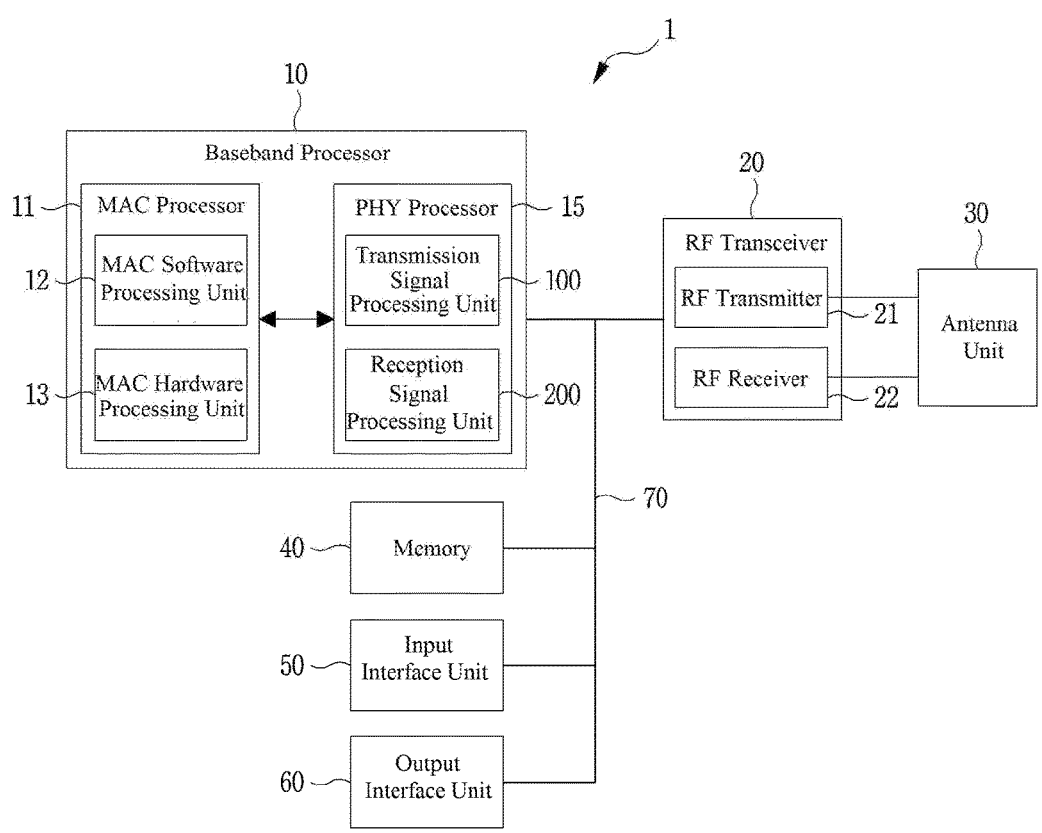
FIG. 1 is a block diagram of a Wireless Local Area Network (WLAN) device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a Wireless Local Area network (WLAN), a Basic Service Set (BSS) includes a plurality of WLAN devices. A WLAN device may include a Medium Access Control (MAC) layer and a PHYsical (PHY) layer according to Institute of Electrical and Electronics Engineers (IEEE) 802.11 series standards. In the plurality of WLAN devices, at least one the WLAN device may be an Access Point (AP) and the other WLAN devices may be non-AP Stations (non-AP STAs). Alternatively, all of the plurality of WLAN devices may be non-AP STAs in an ad-hoc networking environment. In general, AP STA and non-AP STA may be each referred to as a STA or may be collectively referred to as STAs. However, for ease of description herein, only the non-AP STAs may be referred to herein as the STAs.

FIG. 1 is a block diagram of a WLAN device.

Referring to FIG. 1, a WLAN device 1 includes a baseband processor 10, a Radio Frequency (RF) transceiver 20, an antenna unit 30, a memory 40, an input interface unit 50, an output interface unit 60, and a bus 70.

The baseband processor 10 may be simply referred to as a processor, performs baseband signal processing described in the present specification, and includes a MAC processor (or MAC entity) 11 and a PHY processor (or PHY entity) 15.

In an embodiment of the present invention, the MAC processor 11 may include a MAC software processing unit 12 and a MAC hardware processing unit 13. The memory 40 may store software (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer as hardware (hereinafter referred to as 'MAC hardware'). However, the MAC processor 11 is not limited to the foregoing implementation examples.

The PHY processor 15 includes a transmitting (TX) signal processing unit 100 and a receiving (RX) signal processing unit 200.

The baseband processor 10, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple input Multiple Output (MIMO) or Multi-User MIMO (MU-MIMO) is used, the antenna unit 30 may include a plurality of antennas.

Figure 2:
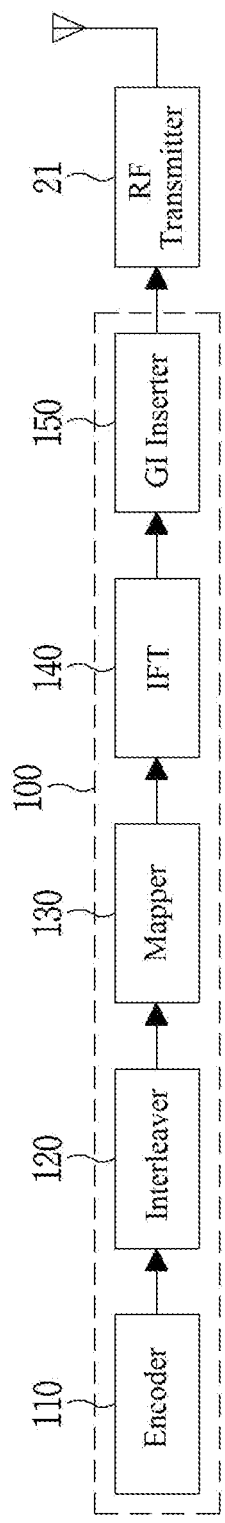
FIG. 2 is a schematic block diagram of an exemplary transmitting signal processing unit in a WLAN.

FIG. 2 is a schematic block diagram of an exemplary transmission signal processor in a WLAN.

Referring to FIG. 2, the transmitting signal processing unit 100 may include an encoder 110, an interleaver 120, a mapper 130, an Inverse Fourier Transformer (IFT) 140, and a Guard Interval (GI) inserter 150.

The encoder 110 encodes input data. For example, the encoder 110 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder 110 to change the order of bits. Interleaving may be applied only when BCC encoding is used in the encoder 110. The mapper 130 maps the sequence of bits output from the interleaver 120 to constellation points. If LDPC encoding is used in the encoder 110, the mapper 130 may further perform LDPC tone mapping in addition to constellation mapping.

When MIMO or MU-MIMO is used, the transmitting signal processing unit 100 may use a plurality of interleavers 120 and a plurality of mappers 130 corresponding to the number of spatial streams, $N_{SS}$. In this case, the transmitting signal processing unit 100 may further include a stream parser for dividing outputs of the BCC encoders or output of the LDPC encoder into blocks that are sent to different interleavers 120 or mappers 130. The transmitting signal processing unit 100 may further include a Space-Time Block Code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of constellation points output from the mapper 130 or the spatial mapper to a time-domain block (i.e., a symbol) by using Inverse Discrete Fourier Transform (IDFT) or Inverse Fast Fourier Transform (IFFT). If the STBC encoder and the spatial mapper are used, the IFT 140 may be provided for each transmit chain.

When MIMO or MU-MIMO is used, the transmitting signal processing unit 100 may insert Cyclic Shift Diversities (CSDs) to prevent unintentional beamforming. The CSD insertion may occur before or after IFT. The CSD may be specified per transmit chain or may be specified per space-time stream. Alternatively, the CSD may be applied as a part of the spatial mapper.

When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 3:
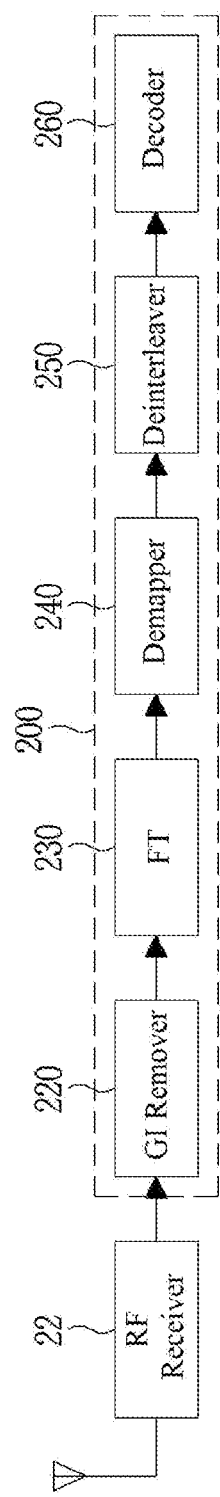
FIG. 3 is a schematic block diagram of an exemplary receiving signal processing unit in a WLAN.

FIG. 3 is a schematic block diagram of an exemplary a receiving signal processor in a WLAN.

Referring to FIG. 3, the receiving signal processing unit 200 includes a GI remover 220, a Fourier Transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time-domain block) into a block of constellation points by using a Discrete Fourier Transform (DFT) or a Fast Fourier Transform (FFT). The FT 230 may be provided for each receive chain.

When MIMO or MU-MIMO is used, the receiving signal processing unit 200 may include a spatial demapper for converting Fourier Transformed receiver chains to constellation points of the space-time streams, and an STBC decoder for despreading the constellation points from the space-time streams into the spatial streams.

The demapper 240 demaps the constellation points output from the FT 230 or the STBC decoder to bit streams. If LDPC encoding is applied to the received signal, the demapper 240 may further perform LDPC tone demapping before constellation demapping. The deinterleaver 250 deinterleaves the bits of each stream output from the demapper 240. Deinterleaving may be applied only when a BCC encoding scheme is applied to the received signal.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, shortly as a 'listen before talk' access mechanism. According to the CSMA/CA mechanism, an AP and/or a STA may sense a medium or a channel for a predetermined time before starting transmission, that is, may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in minimizing collisions.

Figure 4:
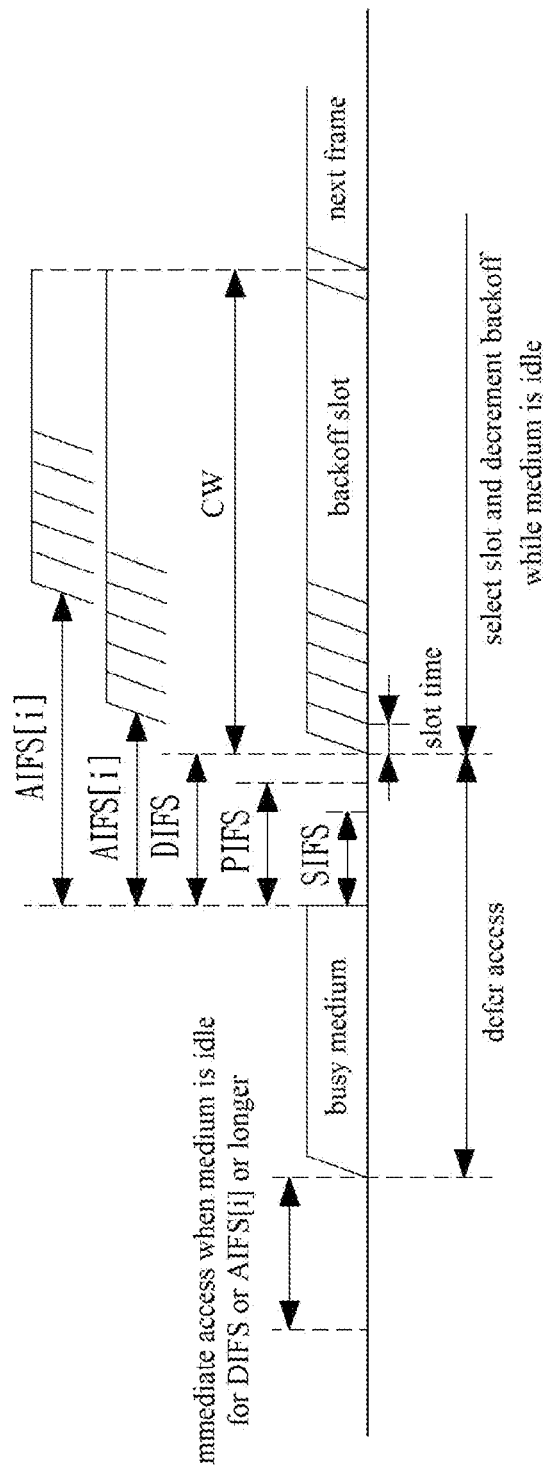
FIG. 4 depicts a relationship between InterFrame Spaces (IFSs)

FIG. 4 depicts a relationship between InterFrame Spaces (IFSs).

WLAN devices may exchange data frames, control frames, and management frames with each other.

A data frame is used for transmission of data forwarded to a higher layer. The WLAN device transmits the data frame after performing backoff if a Distributed Coordination Function IFS (DIFS) has elapsed from a time when the medium has been idle. A management frame is used for exchanging management information which is not forwarded to the higher layer. The WLAN device transmits the management frame after performing backoff if an IFS such as the DIFS or a Point Coordination Function IFS (PIFS) has elapsed. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. In the case that the control frame is not a response frame to another frame, the WLAN device transmits the control frame after performing backoff if the DIFS has elapsed. In case that the control frame is a response frame to another frame, the WLAN device transmits the control frame without performing backoff if a Short IFS (SIFS) has elapsed. The type and subtype of a frame may be identified by a type field and a subtype field in a Frame Control (FC) field.

On the other hand, a Quality of Service (QoS) STA transmits a frame after performing backoff if an Arbitration IFS (AIFS) for an associated Access Category (AC), i.e., AIFS[i] (i is determined based on AC) has elapsed. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium gets idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempt transmission. The random backoff count is determined based on a Contention Window (CW) parameter and the medium is monitored continuously during count-down of backoff slots (i.e. decrement a backoff count-down) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
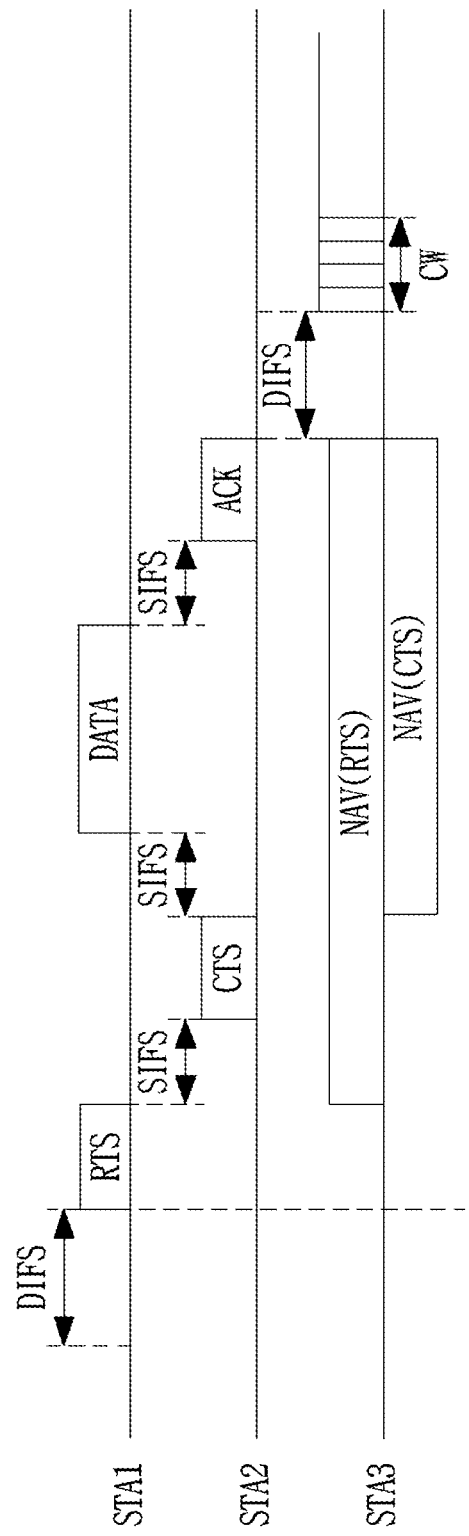
FIG. 5 is a conceptual diagram illustrating a procedure for transmitting a frame in Carrier Sense Multiple Access with Collision Avoidance (CSMA/CA) for avoiding collisions between frames in a channel.

FIG. 5 is a conceptual diagram illustrating a CSMA/CA-based frame transmission procedure for avoiding collisions between frames in a channel.

Referring FIG. 5, a first STA (STA1) is a transmit WLAN device for transmitting data, a second STA (STA2) is a receive WLAN device for receiving the data from STA1, and a third STA (STA3) is a WLAN device which may be located in an area where a frame transmitted from STA1 and/or a frame transmitted from STA2 can be received by STA3.

STA1 may determine whether the channel is busy by carrier sensing. The STA1 may determine the channel occupation based on an energy level on the channel or correlation of signals in the channel, or may determine the channel occupation by using a Network Allocation Vector (NAV) timer.

After determining that the channel is not being used by other devices during DIFS (that is, the channel is idle), STA1 may transmit an RTS frame to STA2 after performing backoff. Upon receiving the RTS frame, STA2 may transmit a CTS frame as a response to the CTS frame after SIFS.

When STA3 receives the RTS frame, STA3 may set the NAV timer for a transmission duration of subsequently transmitted frame by using duration information included in the RTS frame. For example, the NAV timer may be set for a duration of SIFS+CTS frame duration+SIFS+data frame duration+SIFS+ACK frame duration. When STA3 receives the CTS frame, it may set the NAV timer for a transmission duration of subsequently transmitted frames by using duration information included in the CTS frame. For example, the NAV timer may be set for a duration of SIFS+a data frame duration+SIFS+an ACK frame duration. Upon receiving a new frame before the NAV timer expires, STA3 may update the NAV timer by using duration information included in the new frame. STA3 does not attempt to access the channel until the NAV timer expires.

When STA1 receives the CTS frame from STA2, it may transmit a data frame to STA2 after SIFS elapsed from the CTS frame has been completely received. Upon successfully receiving the data frame, STA2 may transmit an ACK frame as a response to the data frame after SIFS elapsed.

When the NAV timer expires, STA3 may determine whether the channel is busy through the use of carrier sensing. Upon determining that the channel is not in use by other devices during DIFS and after the NAV timer has expired, STA3 may attempt channel access after a contention window after a random backoff has elapsed.

Figure 6:
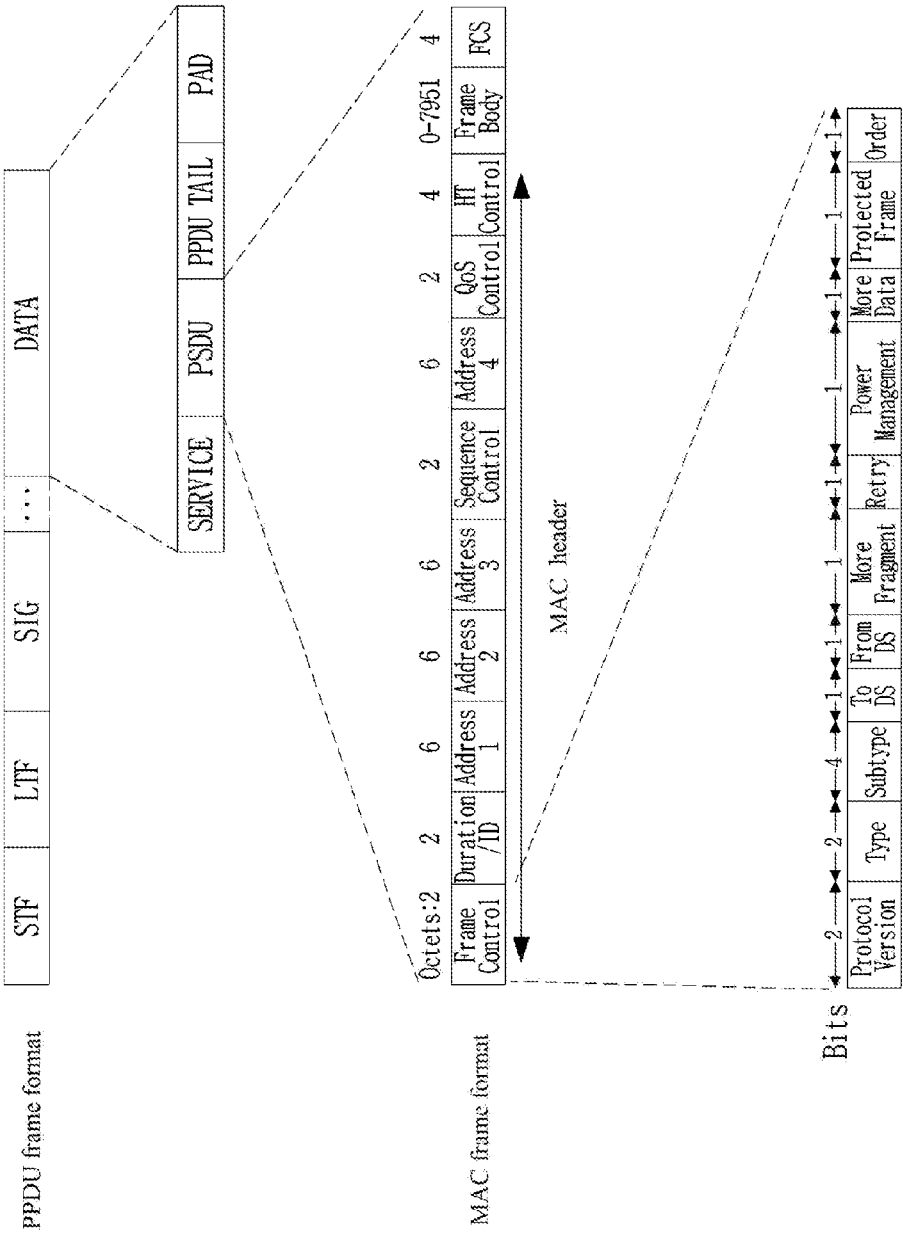
FIG. 6 depicts an exemplary frame structure in a WLAN system.

FIG. 6 depicts an exemplary frame structure in a WLAN system.

PHY layer may prepare a transmission MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of a PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. A part of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification.

The Frame Control field of the MAC header may include Protocol Version, Type, Subtype, To DS, From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present invention defines a new PPDU frame format for the IEEE 802.11ax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HE-xyz' in the following descriptions).

In present specification, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
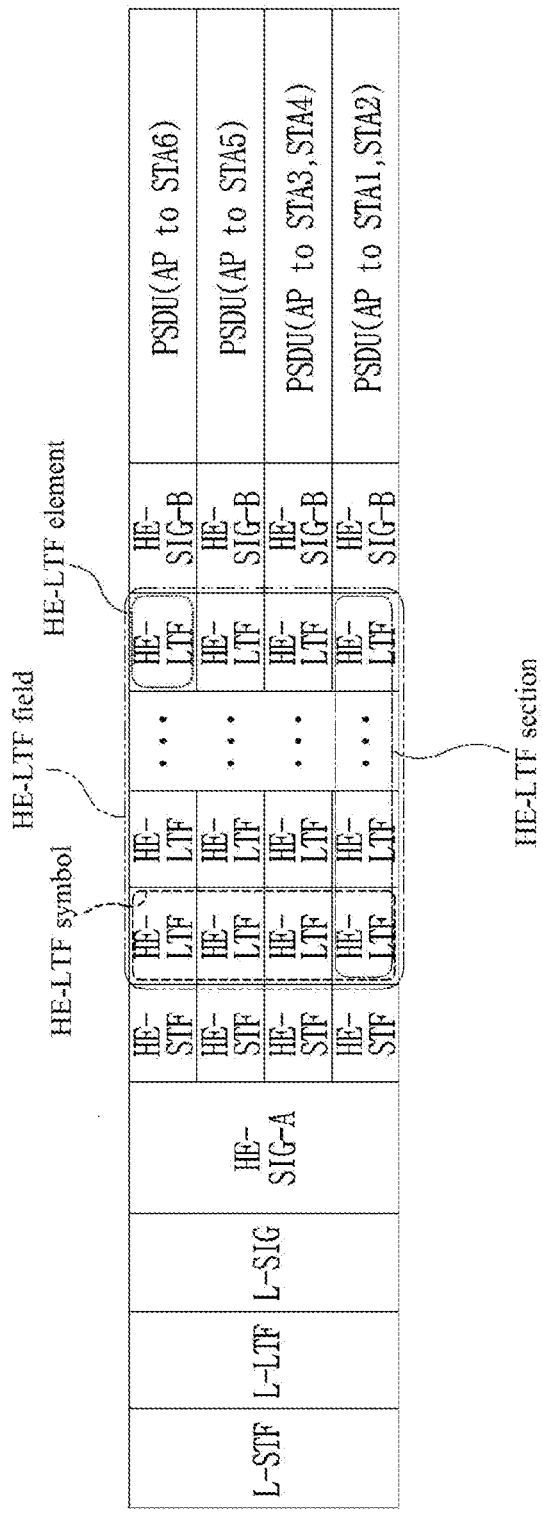
FIG. 7 depicts an exemplary High Efficiency (HE) Physical layer Protocol Data Unit (PPDU) frame format according to the present invention.

FIG. 7 depicts an exemplary HE PPDU frame format according to the present invention.

Referring to FIG. 7, the vertical axis represents frequency and the horizontal axis represents time. It is assumed that frequency and time increase in the upward direction and the right direction, respectively.

In the example of FIG. 7, one channel includes four subchannels. An L-STF, an L-LTF, an L-SIG, and an HE-SIG-A may be transmitted per channel (e.g., 20 MHz), a HE-STF and a HE-LTF may be transmitted on each subchannel being a basic subchannel unit (e.g., 5 MHz), and a HE-SIG-B and a PSDU may be transmitted on each of subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 7, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may be referred to as Resource Unit (RU) or subband. In particular, the terms like OFDMA subchannel, OFDMA RU, OFDMA subband can be used in embodiments for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to a STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 7, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements should be understood as logical units and the PHY layer does not necessarily operate in units of an HE-LTF element. In the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to a STA) in frequency domain.

A HE-LTF field may be a set of HE-LTF elements, HE-LTF symbols, or HE-LTF sections for a plurality of stations.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., setting a NAV based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The parameters set included in the HEW SIG-A field may include one or more of Very High Throughput (VHT) PPDU modulation parameters transmitted by IEEE 802.11ac stations, as listed in [Table 1] below, to ensure backward compatibility with legacy STAs (e.g., IEEE 802.11ac stations).

TABLE 1

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |
| | B3 | STBC | 1 | For a VHT SU PPDU: Set to 1 if space time block coding is used and set to 0 otherwise. For a VHT MU PPDU: Set to 0. |
| | B4-B9 | Group ID | 6 | Set to the value of the TXVECTOR parameter GROUP_ID. A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \le p \le 3$, uses bits B(10 + 3p) to B(12 + 3p). The number of space-time streams for user u are indicated at user position p = USER_POSITION[u] where u = 0, 1, . . . , NUM_USERS − 1 and the notation A[b] denotes the value of array A at index b. Zero space-time streams are indicated at positions not listed in the USER_POSITION array. Each user position is set as follows: Set to 0 for 0 space-time streams Set to 1 for 1 space-time stream Set to 2 for 2 space-time streams Set to 3 for 3 space-time streams Set to 4 for 4 space-time streams Values 5-7 are reserved For a VHT SU PPDU: B10-B12 Set to 0 for 1 space-time stream Set to 1 for 2 space-time streams Set to 2 for 3 space-time streams Set to 3 for 4 space-time streams Set to 4 for 5 space-time streams Set to 5 for 6 space-time streams Set to 6 for 7 space-time streams Set to 7 for 8 space-time streams B13-B21 Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise. The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |

TABLE 1-continued

| Two parts of VHT-SIG-A | Bit | Field | Number of bits | Description |
|---|---|---|---|---|
| | B2 | SU/MU[0] Coding | 1 | For a VHT SU PPDU, B2 is set to 0 for BCC, 1 for LDPC For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU: VHT-MCS index For a VHT MU PPDU: If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1. If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1. If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1. B7 is reserved and set to 1 |
| | B8 | Beamformed | 1 | For a VHT SU PPDU: Set to 1 if a Beamforming steering matrix is applied to the waveform in an SU transmission as described in 20.3.11.11.2, set to 0 otherwise. For a VHT MU PPDU: Reserved and set to 1 NOTE-If equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0-23 of VHT-SIG-A1 and bits 0-9 of VHT-SIG-A2, respectively. |
| | B18-B23 | Tail | 6 | Used to terminate the trellis of the convolutional decoder. Set to 0. |

[Table 1] illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11ac-2013 technical specification. In the HE PPDU frame format of the present invention, the HE-SIG-A field may include one or more of the fields included in the VHT-SIG-A field, and it may provide backward compatibility with IEEE 802.11ac stations.

Figure 8:
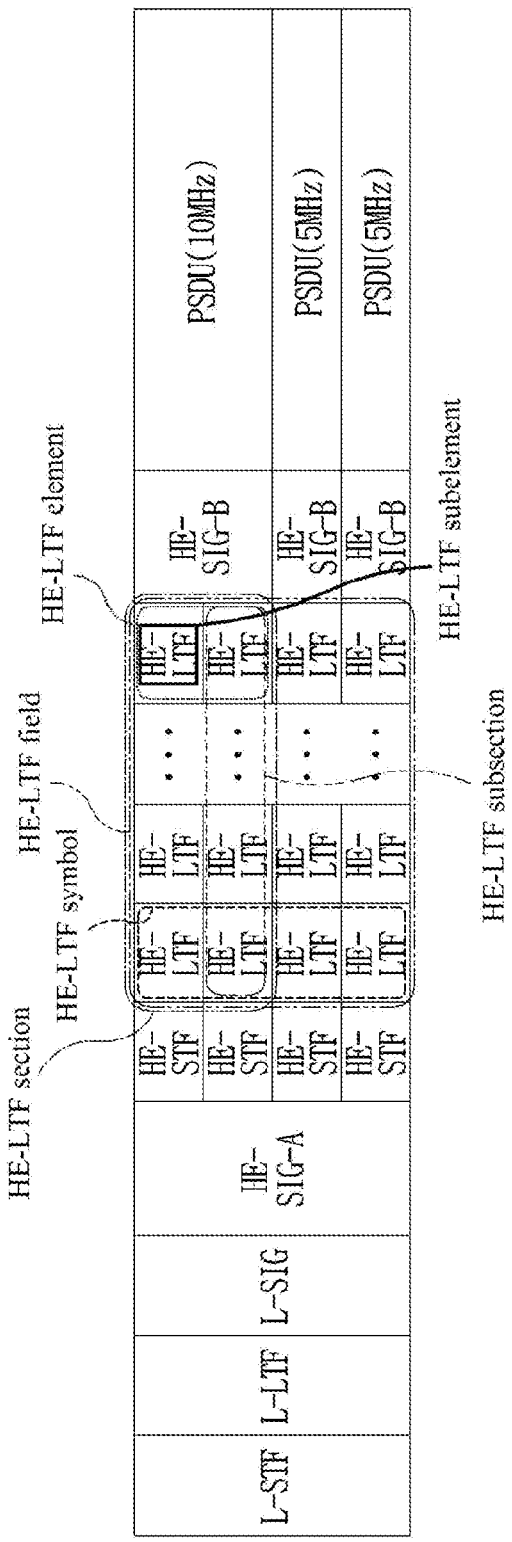
FIG. 8 depicts subchannel allocation in a HE PPDU frame format according to the present invention.

FIG. 8 depicts subchannel allocation in the HE PPDU frame format according to the present invention.

In FIG. 8, it is assumed that information indicating subchannels allocated to STAs in HE PPDU indicates that 0 MHz subchannel is allocated to STA1 (i.e., no subchannel is allocated), a 5-MHz subchannel is allocated to each of STA2 and STA3, and a 10-MHz subchannel is allocated to STA4.

In the example of FIG. 8, an L-STF, an L-LTF, an L-SIG, and a HE-SIG-A may be transmitted per channel (e.g., 20 MHz), a HE-STF and a HE-LTF may be transmitted on each of subchannels being basic subchannel units (e.g., 5 MHz), and a HE-SIG-B and a PSDU may be transmitted on each of subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 8, the size of a subchannel allocated to STA2 is equal to that of the basic subchannel unit, the size of a subchannel allocated to STA3 is equal to that of the basic subchannel unit, and the size of a subchannel allocated to STA4 is twice larger than that of the basic subchannel unit.

FIG. 8 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 8, one HE-LTF element includes one HE-LTF subelement in the 5-MHz subchannel allocated to STA2 or STA3. On the other hand, one HE-LTF element includes two HE-LTF subelements in the third subchannel, i.e., 10-MHz subchannel, allocated to STA4. It is to be understood that a HE-LTF element and a HE-LTF subelement are logical units and the PHY layer does not always operate in units of a HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to a STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 8, one HE-LTF section includes one HE-LTF subsection in the 5-MHz subchannel allocated to STA2 or STA3. On the other hand, one HE-LTF section includes two HE-LTF subsections in the third subchannel, i.e., 10-MHz subchannel, allocated to STA4.

A HE-LTF field may correspond to a set of HE-LTF elements (or subelements), HE-LTF symbols, or HE-LTF sections (or subsections) for a plurality of stations.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 7, if one channel includes four subchannels, it may not be allowed to keep the third subchannel unallocated and empty, while the first, second, and fourth subchannels are allocated to STAs. However, the present invention does not exclude non-allocation of a intermediate subchannel of one channel to a STA.

Figure 9:
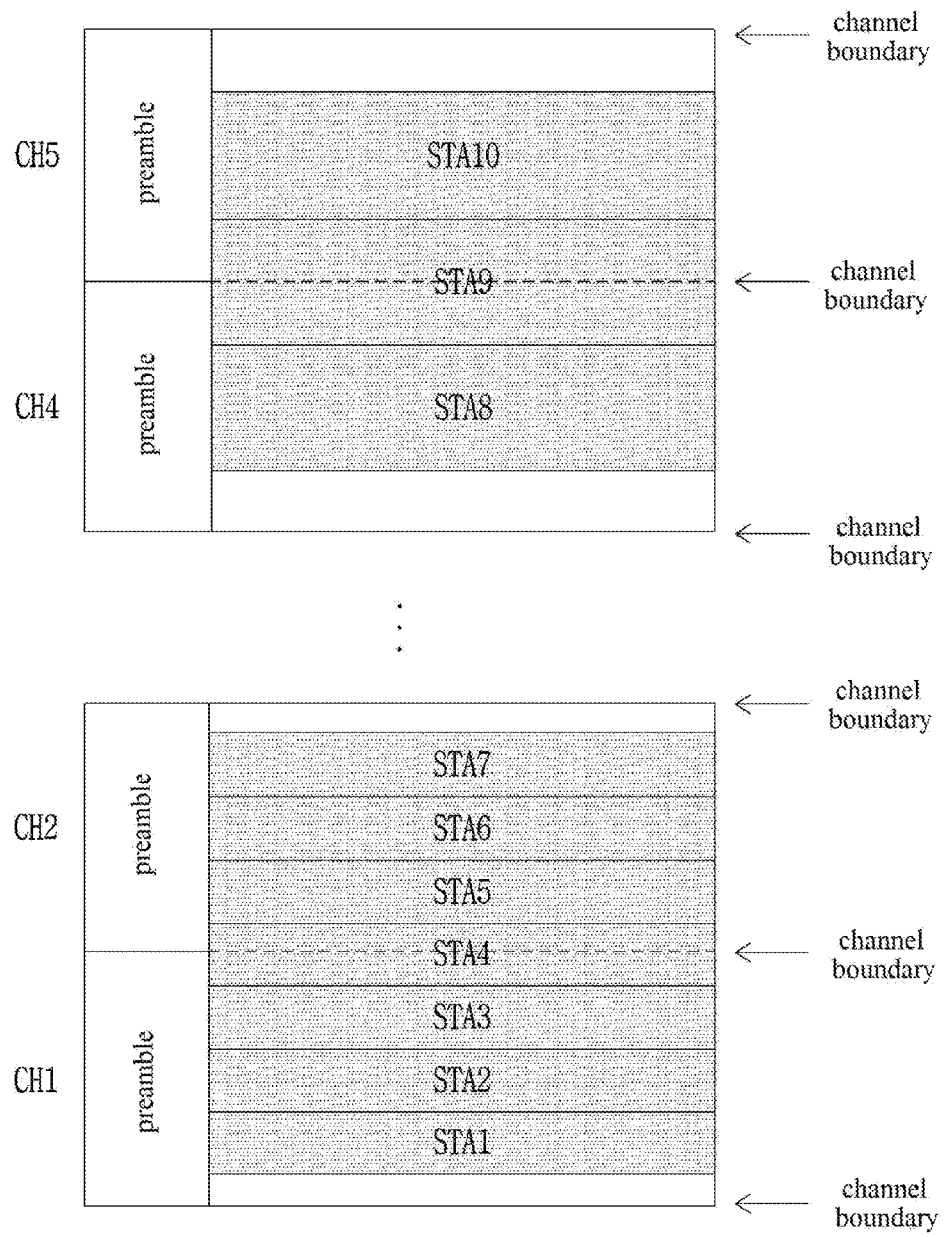
FIG. 9 depicts a subchannel allocation method according to the present invention.

FIG. 9 depicts a subchannel allocation method according to the present invention.

In the example of FIG. 9, a plurality of contiguous channels (e.g., 20-MHz-bandwidth channels) and boundaries of the plurality of contiguous channels are shown. In FIG. 9, a preamble may correspond to an L-STF, an L-LTF, an L-SIG, and a HE-SIG-A as illustrated in the examples of FIGS. 7 and 8.

A subchannel for each HE STA may be allocated only within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 9 is based on the assumption that subchannels each having the size of a basic subchannel unit (e.g., 5 MHz) in CH1 and CH2 are allocated to STA1 to STA7, and subchannels each having double the size (e.g., 10 MHz) of the basic subchannel unit in CH4 and CH5 are allocated to STA8, STA9, and STA10.

As illustrated in the lower part of FIG. 9, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to the two channels). In the forgoing example of the present invention, the subchannel allocation to STA4 is not allowed.

As illustrated in the upper part of FIG. 9, although a subchannel allocated to STA8 or STA10 is fully overlapped only with one channel (i.e., crossing the channel boundary, or belonging only to one channel), a subchannel allocated to STA9 is partially overlapped with two channels (i.e., crossing the channel boundary, or belonging to the two channels). In the forgoing example of the present invention, the subchannel allocation to STA9 is not allowed.

On the other hand, it may be allowed to allocate a subchannel partially overlapped between a plurality of channels (i.e., crossing the channel boundary, or belonging to two channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present invention and thus should not be construed as limiting the present invention. For example, the bandwidths of a channel and a subchannel may be defined or allocated as values other than the above examples. In addition, a plurality of subchannels in one channel may have the same or different channel widths.

FIG. 10 depicts the starting and ending points of a HE-LTF field in the HE PPDU frame format according to the present invention.

To support the MU-MIMO mode and the OFDMA mode, the HE PPDU frame format according to the present invention may include, in the HE-SIG-A field, information about the number of spatial streams to be transmitted to a HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in detail.

FIG. 10 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are required to support MU-MIMO transmission.

According to an example of the present invention, relationship between a total number of spatial streams transmitted on one subchannel and a number of HE-LTFs is listed in [Table 2].

TABLE 2

| Total number of spatial streams transmitted on one subchannel | Number of HE-LTFs |
|---|---|
| 1 | 1 |
| 2 | 2 |
| 3 | 4 |
| 4 | 4 |
| 5 | 6 |
| 6 | 6 |
| 7 | 8 |
| 8 | 8 |

Referring to [Table 2], if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number of adding 1 to the number of the spatial streams need to be transmitted.

Referring to FIG. 10 again, it is assumed that the second 5-MHz subchannel is allocated to STA3 and STA4 and one spatial streams per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 10, a HE-STF, a HE-LTF, a HE-LTF, a HE-LTF, a HE-LTF, and a HE-SIG-B follow the HE-SIG-A field on the subchannel (i.e., four HE-LTFs are transmitted). This is for setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby no orthogonality is maintained. To overcome this problem, an additional constraint need to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the numbers of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the numbers of HE-LTFs (HE-LTF symbols or HE-LTF elements in a HE-LTF section) required according to the total numbers of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 7) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to [Table 3]). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (P is an integer equal to or larger than 1) HE-LTF symbols (refer to FIG. 7) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e. P) of another subchannel. Also, the number of HE-LTF elements (i.e., P) included in a HE-LTF section in one of the Q subchannels may be equal to the number of HE-LTF elements (i.e. P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or stations).

Referring to FIG. 10 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 10, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are actually not used for channel estimation at the STAs.

FIG. 11 depicts a HE-SIG-B field and a HE-SIG-C field in the HE PPDU frame format according to the present invention.

To effectively support MU-MIMO-mode or OFDMA-mode transmission in the HE PPDU frame format according to the present invention, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, a HE-SIG-A field.

A HE-SIG-B field may include spatial stream allocation information about one subchannel. Also, a HE-SIG-C field may be transmitted after transmission of HE-LTFs, including MCS information about a PSDU and information about the length of the PSDU, etc.

Figure 12:
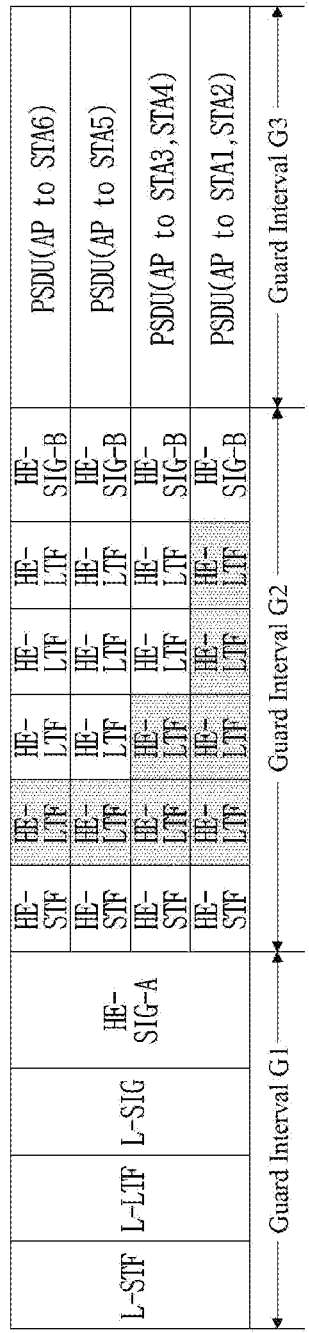
FIG. 12 depicts another example of a HE PPDU frame format according to the present invention.

FIG. 12 depicts OFDM symbol durations and GI lengths in the HE PPDU frame format according to the present invention.

In the HE PPDU frame format according to the present invention, L-STF, L-LTF, L-SIG, and HE-SIG-A fields may be configured with 4.0-μs OFDM symbols based on 64-FFT. One OFDM symbol has a GI of 0.8 μs. In the present invention, a GI value applied to the L-STF, L-LTF, L-SIG, and HE-SIG-A fields is defined as G1. The L-STF, L-LTF, L-SIG, and HE-SIG-A fields may include 3.2-μs OFDM symbols based on 64-FFT, excluding the GIs. The term 64 FFT-based symbol is used mainly based on a channel bandwidth of 20 MHz. If the term 64 FFT-based symbol is used irrespective of a channel bandwidth, a 64 FFT-based symbol may mean a symbol having a symbol duration of 3.2 μs and a subcarrier spacing of 312.5 kHz.

The following HE-STF, HE-LTF, HE-SIG-B, and PSDU fields may include 16-μs OFDM symbols based on 256-FFT. The OFDM symbol duration may be changed according to a GI value. Two types of GI values may be defined for one OFDM symbol during different time periods. A GI value applied to the OFDM symbols of the HE-STF, HE-LTF, and HE-SIG-B fields is defined as G2 and a GI value applied to the OFDM symbols of the PSDU is defined as G3. Excluding the GIs, the HE-STF, HE-LTF, HE-SIG-B, and PSDU fields may be configured with 12.8-μs OFDM symbols based on 256-FFT. The term 256 FFT-based symbol is used mainly based on a channel bandwidth of 20 MHz. If the term 256 FFT-based symbol is used irrespective of a channel bandwidth, a 256 FFT-based symbol may mean a symbol having a symbol duration of 12.8 μs and a subcarrier spacing of 78.125 kHz.

The values of G2 and G3 may be equal or different. If G2 and G3 are equal, G2 and G3 may be defined as one parameter without distinguishing between G2 and G3. Unlike G1, G2 and G3 may vary according to a transmitted PPDU transmission vector, rather than they are fixed values (i.e., predetermined values). This is related to that the lengths of the HE-STF, HE-LTF, and HE-SIG-B fields to which G2 is applied may vary according to a PPDU transmission vector and the length of the PSDU to which G3 is applied may also vary according to the PPDU transmission vector.

For example, G1 may have a fixed value (i.e., a predetermined value) of 0.8 μs, G2 may be a value selected from 3.2 μs, 1.6 μs, 0.8 μs, and 0.4 μs, and G3 may be a value selected from among 3.2 μs, 1.6 μs, 0.8 μs, and 0.4 μs. Also, G1 may have a fixed value (i.e., a predetermined value) of 0.8 μs, and G2 or G3 may be a value selected or determined from among 3.2 μs, 1.6 μs, 0.8 μs, and 0.4 μs. G1 does not require separate signaling because G1 is a fixed value, and signaling information indicating G2 and G3 may be provided in the HE-SIG-A field to a HE STA.

G2 and G3 are applied commonly across all OFDM symbols transmitted during a corresponding time period and across all subchannels. Accordingly, PSDU transmission timings and OFDM symbol timings may be synchronized. For example, it is not allowed to apply a 3.2-μs G2 value to a subchannel and a 1.6-μs or 0.8-μs G2 value to another subchannel during a specific time period. Rather, the same 3.2-μs G2 value should be applied to the subchannels during the same time period. In a similar example, it is not allowed to apply a 1.6-μs G3 value to a subchannel and a 3.2-μs or 0.8-μs G3 value to another subchannel during a specific time period. Rather, the same 1.6-μs G3 value should be applied to the subchannels during the same time period.

In the case where a HE PPDU frame format having HE-LTF sections of different lengths for subchannels is used (i.e., in the case where the number of HE-LTFs is not determined for each subchannel based on the maximum of the numbers of HE-LTFs required according to the total number of spatial streams transmitted on each subchannel in a set of HE STAs allocated to each of subchannels, as described in the example of FIG. 10), if the values of G2 and G3 are different, PSDUs are transmitted on different subchannels at different time points and OFDM symbol timings are not synchronized. Therefore, values of G2 and G3 may need to be selected or determined as a same value.

In the case where a HE PPDU frame format having HE-LTF sections of the same length for subchannels is used (i.e., in the case where the number of HE-LTFs is determined for each subchannel based on the maximum of the numbers of HE-LTFs required according to the total number of spatial streams transmitted on each subchannel in a set of HE STAs allocated to each of subchannels, as described in the example of FIG. 10), even though the values of G2 and G3 are different, PSDUs are transmitted on the subchannels at the same time point, without causing discrepancy between OFDM symbol timings. Therefore, values of G2 and G3 may be selected or determined as different values. However, even in this case, the present invention does not exclude that values of G2 and G3 may be selected or determined as a same value.

In the example of FIG. 12, OFDM symbol durations S1, S2, and S3 may be applied respectively to time periods to which the GIs G1, G2, and G3 are applied.

Figure 13:
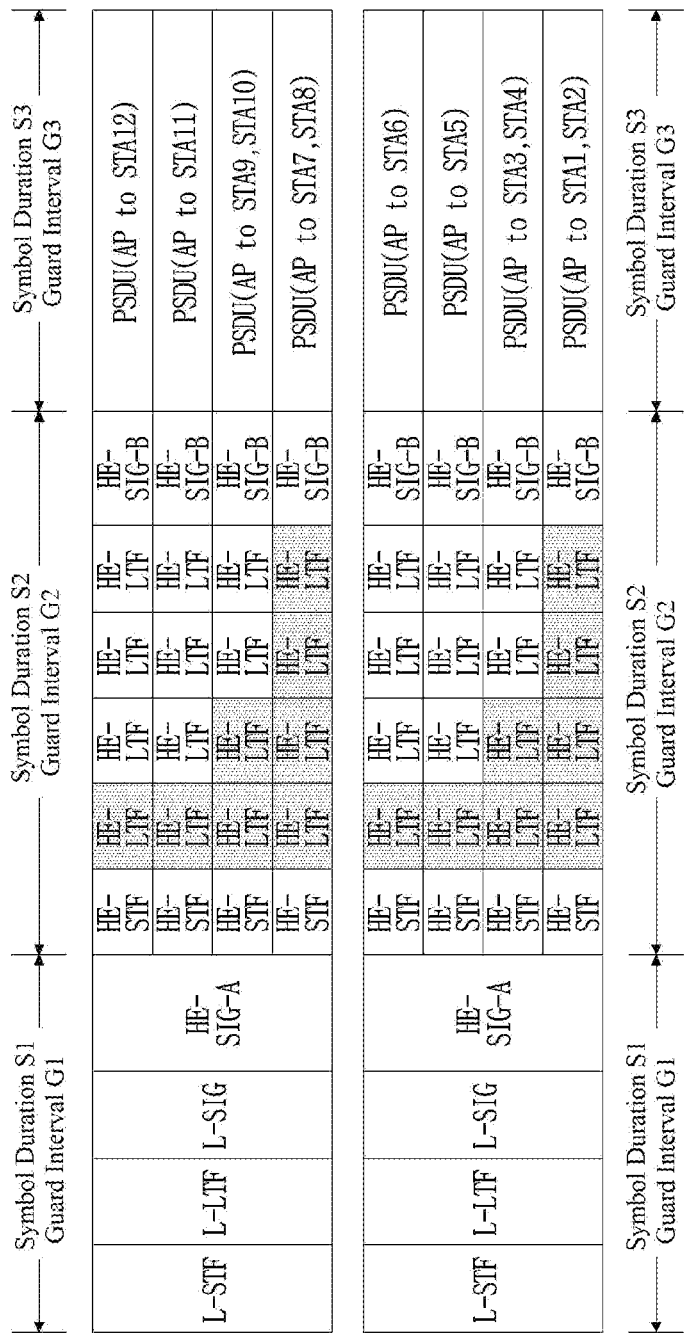
FIG. 13 depicts an exemplary HE PPDU frame format for a wide channel band according to the present invention.

FIG. 13 depicts an exemplary HE PPDU frame format for a wide channel band according to the present invention.

Referring to FIG. 13, the HE PPDU frame format for one 20-MHz channel illustrated in the example of FIG. 12 is extended to two 20-MHz channels. Similarly, HE PPDU frame formats for the channel bandwidths of 80 MHz and 160 MHz may be configured by extending the HE PPDU frame format for one 20-MHz channel illustrated in the example of FIG. 12 to four and eight 20-MHz channels, respectively.

There is no modification involved in extending the HE PPDU frame format for one 20-MHz channel. In other words, all subchannels across one or more 20-MHz channels are the same in terms of PSDU transmission time points, OFDM symbol durations, and GIs.

From this viewpoint, the example described with reference to FIG. 10 in which "the lengths of HE-LTF sections across subchannels are equal" may be extended to simultaneous application on a channel basis as well as on a subchannel basis. Therefore, PSDU transmission timings and OFDM symbol timings are synchronized for users paired for MU-MIMO-mode or OFDMA-mode transmission, thus maintaining orthogonality. This channel-based example will be described below.

Basically in SU-MIMO-mode or non-OFDMA-mode transmission, it is sufficient to transmit as many HE-LTFs as required. However, the timings of fields transmitted on subchannels for other paired STAs need to be synchronized (or aligned) across all subchannels over one or more 20-MHz channels in MU-MIMO-mode or OFDMA-mode transmission. Therefore, the numbers of HE-LTFs on all other subchannels over one or more 20-MHz channels may be determined based on a subchannel having a maximum number of streams among all subchannels over one or more 20-MHz channels in MU-MIMO-mode or OFDMA-mode transmission.

Specifically, the numbers of HE-LTFs to be transmitted on all subchannels may be determined according to the maximum of the numbers of HE-LTFs required according to the total numbers of spatial streams transmitted on each subchannels over one or more 20-MHz channels, for a set of HE STAs allocated to each of the subchannels. Herein, 'the set of HE STAs allocated to each of the subchannels over one or more 20-MHz channels' is one HE STA in the SU-MIMO mode, whereas it is a set of a plurality of HE STAs paired on all subchannels over one or more 20-MHz channels in the MU-MIMO mode or OFDMA mode. The 'total number of spatial streams transmitted on each of all subchannels over one or more 20-MHz channels' is the number of spatial streams transmitted to one HE STA in the SU-MIMO mode and the number of spatial streams transmitted to a plurality of HE STAs paired on the subchannel in the MU-MIMO mode or OFDMA mode.

That is, it may be said that a HE-LTF field starts at the same time point and ends at the same time point on all subchannels over one or more 20-MHz channels for all users (i.e., HE STAs) in MU-MIMO-mode or OFDMA-mode transmission of a HE PPDU. Or it may be said that the lengths of HE-LTF sections are equal on all subchannels over one or more 20-MHz channels for all HE STAs in MU-MIMO-mode or OFDMA-mode transmission. Or it may be said that the number of HE-LTF elements included in each HE-LTF section is equal in all subchannels over one or more 20-MHz channels for all HE STAs in MU-MIMO-mode or OFDMA-mode transmission. Accordingly, PSDU transmission timings may be synchronized between all subchannels over one or more 20-MHz channels for all HE STAs in MU-MIMO-mode or OFDMA-mode transmission.

In FIG. 13, the OFDM symbol duration and GI of L-STF, L-LTF, L-SIG, and HE-SIG-A fields on the first 20-MHz subchannel are S1 and G1, respectively. Like the first 20-MHz subchannel, the first 20-MHz subchannel has S1 and G1 respectively as the OFDM symbol duration and GI of L-STF, L-LTF, L-SIG, and HE-SIG-A fields.

In FIG. 13, a HE-STF field, a plurality of HE-LTFs, and a HE-SIG-B field on the first 20-MHz channel are S2 and G2, respectively. Like the first 20-MHz channel, the OFDM symbol duration and GI of a HE-STF field, a plurality of HE-LTFs, and a HE-SIG-B field on the second 20-MHz channel are also S2 and G2, respectively.

In FIG. 13, the OFDM symbol duration and GI of a PSDU on the first 20-MHz channel are S3 and G3, respectively. Like the first 20-MHz channel, the OFDM symbol duration and GI of a PSDU on the second 20-MHz channel are also S3 and G3, respectively.

This example means that if the OFDM symbol duration and GI of one 20-MHz channel are determined based on 64-FFT, the OFDM symbol duration and GI of the other 20-MHz channel(s) should be determined based on 64-FFT. In other words, if the OFDM symbol duration and GI of one 20-MHz channel are determined based on 64-FFT, the OFDM symbol duration and GI of the other 20-MHz channel(s) should not be determined based on 256-FFT.

In a modification example, although subchannels within one 20-MHz channel may have the same OFDM symbol durations and the same GIs, subchannels within another 20-MHz channel may have different OFDM symbol durations and GIs. For example, while S2, G2, S3, and G3 are applied as OFDM symbol durations and GIs for subchannels within the first 20-MHz channel, different values (e.g., S4, G4, S5, and G5) may be applied as OFDM symbol durations and GIs for subchannels within the second 20-MHz channel. Even in this case, the OFDM symbol duration and GI, S1 and G1, applied to L-STF, L-LTF, and L-SIG fields in a different 20-MHz channel are the same fixed values in every 20-MHz channel.

Further, this modification example may include application of the example described before with reference to FIG. 10 in which 'subchannels have the same HE-LTF section length' only to subchannels within one 20-MHz channel, not to the HE-LTF section length of subchannels in another 20-MHz channel.

With reference to the foregoing examples of the present invention, mainly the features of a HE PPDU frame structure applicable to a DL MU-MIMO-mode or OFDMA-mode transmission that an AP transmits simultaneously to a plurality of STAs have been described. Now, a description will be given of the features of a HE PPDU frame structure applicable to a UL MU-MIMO-mode or OFDMA-mode transmission that a plurality of STAs transmits simultaneously to an AP.

The above-described various examples of structures of the HE PPDU frame format supporting MU-MIMO-mode or OFDMA-mode transmission should not be understood as applicable only to DL without applicable UL. Rather, the examples should be understood as also applicable to UL. For example, the above-described exemplary HE PPDU frame formats may also be used for a UL HE PPDU transmission that a plurality of STAs simultaneously transmits to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to a HE STA allocated to each of a plurality of subchannels. Therefore, the AP may include, in a HE-SIG-A field or a HE-SIG-B field, information about the total number of spatial streams transmitted across a channel, a maximum number of spatial streams (i.e., information being a basis of the number of HE-LTF elements (or the starting point and ending point of a HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmits to an AP, each STA being a transmission entity may be aware only of the number of spatial streams in a HE PSDU that it will transmit, without knowledge of the number of spatial streams in a HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, a HE PPDU frame format applicable to a UL MU-MIMO or OFDMA mode may be configured without a modification to an exemplary HE PPDU frame format applied to a DL MU-MIMO or OFDMA mode. For example, each STA may configure a HE PPDU frame format by including information about the number of spatial streams across a channel in a HE-SIG-A field, determining the number of HE-LTF elements (or the starting point and ending point of a HE-LTE section) on each subchannel according to the maximum number of spatial streams, and including information about the number of spatial streams for the individual STA in a HE-SIG-B field.

Alternatively, if the STAs operate always according to the common/individual parameters received in the trigger frame from the AP, each STA does not need to indicate the common/individual parameters to the AP during a HE PPDU transmission. Therefore, this information may not be included in a HE PPDU. For example, each STA may have only to determine the total number of spatial streams, the maximum number of spatial streams, and the number of spatial streams allocated to individual STA, as indicated by the AP, and configure a HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel BandWidth (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before a HE-LTF field because the number of spatial streams and the information indicating whether STBC is used or not are significant to determination of configuration information about a preamble and a PSDU in a HE PPDU frame format (e.g., the number of HE-LTF elements is determined according to a combination of the number of spatial streams and the information indicating whether STBC is used or not). For this purpose, a HE PPDU frame format as illustrated in FIG. 14 may be used for a UL HE PPDU transmission.

FIG. 14 depicts another exemplary HE PPDU frame format according to the present invention. The HE PPDU frame format illustrated in FIG. 14 is characterized in that a structure of HE-SIG-A, HE-SIG-B, and HE-SIG-C fields similar to in FIG. 10 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of a HE-SIG-B field, a HE-SIG-C field, and a first HE-LTF element (i.e., a HE-LTF between a HE-STF field and a HE-SIG-B field) illustrated in FIG. 14 may not exist. In this case, a description of each field given below may be understood that it is applied only in the presence of the field.

In the example of FIG. 14, a HE-SIG-A field is transmitted per channel (i.e., per 20-MHz channel) and may include transmission parameters common to simultaneously transmitted HE PSDUs. Since the same information is transmitted in up to HE-SIG-A fields in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similarly to DL MU-MIMO-mode or OFDMA-mode HE PPDU transmission, transmissions of PSDUs may start at different time points on subchannels in UL MU-MIMO-mode or OFDMA-mode HE PPDU transmission, and if OFDM symbols are not aligned accordingly, then the implementation complexity of an AP that receives a plurality of PSDUs increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 10.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

In the HE PPDU frame format supporting UL MIMO-mode or OFDMA-mode transmission illustrated in FIG. 14, the L-STF, L-LTF, L-SIG, and HE-SIG-A fields may include 4.0-μs OFDM symbols based on 64-FFT. One OFDM symbol has a GI of 0.8 μs. In the present description, A GI value applied to the L-STF, L-LTF, L-SIG, and HE-SIG-A fields is defined as G1. Excluding the GI, the L-STF, L-LTF, L-SIG, and HE-SIG-A fields may be configured as 3.2-μs OFDM symbols based on 64-FFT.

In the example of FIG. 14, a HE-STF field, a HE-LTF field, a HE-SIG-B field, HE-LTF elements(s) in a HE-LTF section, HE-SIG-C field and a PSDU may include 16-μs OFDM symbols based on 256-FFT. The OFDM symbol duration may be changed according to a GI value. Two types of GI values may be defined for one OFDM symbol for different time periods. A GI value applied to the OFDM symbols of the HE-STF field, the HE-LTF field, the HE-SIG-B field, the HE-LTF elements(s) in the HE-LTF section, and the HE-SIG-C field is defined as G2 and a GI value applied to the OFDM symbols of the PSDU is defined as G3. Excluding the GIs, the HE-STF field, the HE-LTF field, the HE-SIG-B field, and the PSDU may include 12.8-μs OFDM symbols based on 256-FFT.

The values of G2 and G3 may be equal or different. If G2 and G3 are equal, G2 and G3 may be defined as one parameter without distinguishing G2 from G3. Unlike G1, G2 and G3 may vary according to each transmitted PPDU transmission vector, rather than they are fixed values (i.e. predetermined values known to both a transmitter and a receiver). This is related to the fact that the lengths of the HE-STF, the HE-LTF, the HE-SIG-B, the HE-LTF element(s) in a HE-LTF section, and the HE-SIG-C to which G2 is applied may vary according to a PPDU transmission vector and the length of the PSDU to which G3 is applied may also vary according to the PPDU transmission vector.

In another example, the G1 applied to the L-STF, L-LTF, L-SIG, and HE-SIG-A fields (to which 64-FFT is applied) may be a fixed value (i.e., a predefined value known to both a transmitter and a receiver) and one of G2 and G3 (if G2 and G3 are equal, they may be defined as one parameter) applied to the following fields (i.e., the HE-STF, HE-LTF, HE-SIG-B, HE-SIG-C, and PSDU to which 256-FFT is applied) may be configured or indicated as a variable value (e.g., one of 3.2 μs, 1.6 μs, 0.8 μs, and 0.4 μs).

More specifically, G1 may have a fixed value (i.e. a predefined value known to both a transmitter and a receiver) of 0.8 μs, G2 may be a value selected or indicated from among 3.2 μs, 1.6 μs, 0.8 μs, and 0.4 μs, and G3 may be a value selected or indicated from among 3.2 μs, 1.6 μs, 0.8 μs, and 0.4 μs. Also, G1 may be a fixed value (i.e. a predefined value known to both a transmitter and a receiver) of 0.8 μs, and G2 or G3 may be a value selected or indicated from among 3.2 μs, 1.6 μs, 0.8 μs, and 0.4 μs. G1 does not require signaling because G1 is a fixed value, and signaling information indicating G2 and G3 may be provided to the AP. If a HE STA performs UL transmission according to triggering of the AP (or based on parameters provided by the AP), the HE-STA does not need to indicate the value of G2 or G3 to the AP.

G2 and G3 are applied commonly across all OFDM symbols transmitted during a corresponding time period and across all subchannels. Accordingly, PSDU transmission timings may be synchronized, and OFDM symbol timings may be synchronized. For example, it is not allowed that, if a 3.2-μs G2 value is applied to a subchannel during a specific time period, a 1.6-μs or 0.8-μs G2 value is applied to other subchannels during the same time period. Rather, the same 3.2-μs G2 value may be applied to other subchannels during the same time period. In a similar example, it is not allowed that, if a 1.6-μs G3 value is applied to a subchannel during a specific time period, a 3.2-μs or 0.8-μs G3 value is applied to other subchannels during the same time period. Rather, the same 1.6-μs G3 value may be applied to other subchannels during the same time period.

In the case where a HE PPDU frame format having HE-LTF sections of different lengths for subchannels is used (i.e., in the case where 'the number of HE-LTFs is not determined for each subchannel based on the maximum of the numbers of HE-LTFs required according to the total numbers of spatial streams transmitted on subchannels in a set of HE STAs allocated to each of the subchannels'), if the values of G2 and G3 are different, a PSDU is transmitted on each subchannel at a different time point and OFDM symbol timings are not synchronized. Therefore, the same values may need to be selected or indicated as G2 and G3 in this case.

In the case where a HE PPDU frame format having HE-LTF sections of the same length for subchannels is used (i.e., in the case where 'the number of HE-LTFs is determined for each subchannel based on the maximum of the numbers of HE-LTFs required according to the total numbers of spatial streams transmitted on subchannels in a set of HE STAs allocated to each of the subchannels'), even though the values of G2 and G3 are different, PSDUs are transmitted on the subchannels at the same time point, without causing discrepancy between OFDM symbol timings. Therefore, selection or indication of different values as G2 and G3 does not cause a problem. However, even in this case, selection or indication of the same values as G2 and G3 is not excluded.

In the example of FIG. 14, OFDM symbol durations S1, S2, and S3 may be applied respectively to time periods to which the GIs G1, G2, and G3 are applied.

FIG. 19 illustrates an exemplary HE PPDU frame format that maintains the OFDM symbol timing of each subchannel aligned even though STA1, STA2, STA3, STA4 transmits HE PPDUs simultaneously to an AP at different PSDU transmission time points (with different HE-LTF field lengths) across users (or subchannels). In the case of different PSDU transmission time points across users (or subchannels), OFDM symbol misalignment increases the implementation complexity of the AP that receives a plurality of PSDUs simultaneously. Accordingly, a HE PPDU frame format that maintains OFDM symbol timings is required.

It has been described before with reference to the example of FIG. 14 that the length of a time period to which the guard interval G2 of the HE PPDU frame format supporting UL MU-MIMO-mode or OFDMA-mode transmission is applied is variable (i.e., the length of a HE-STF, a HE-LTF, a HE-SIG-B field, HE-LTF element(s) in a HE-LTF section, and a HE-SIG-C field to which G2 is applied is variable according to a PPDU transmission vector). In addition to the example of FIG. 17, it is proposed in the example of FIG. 19 that a time period to which G2 is applied in the HE PPDU frame format varies.

Specifically, the guard interval G2 of the HE PPDU frame format may be defined as a GI value applied to a HE-STF, a HE-LTF, a HE-SIG-B field, HE-LTF element(s) in a HE-LTF section, and a HE-SIG-C field. For example, the guard interval G2 may be applied only to the HE-STF, or only to the first HE-LTF element (i.e., the HE-LTF between the HE-STF and the HE-SIG-B field), or only to the HE-SIG-B field, or only to the HE-SIG-C field. Or the guard interval G2 may be applied only to a combination of one or more of the HE-STF, the first HE-LTF element, the HE-SIG-B field, and the HE-SIG-C field. Further, G2 may be applied to the whole or a part of a PSDU. A time period to which G2 is applied may be set to 0 (i.e., there may be no time period to which G2 is applied). While G2 is applied only to the HE-STF and the first HE-LTF element (i.e., the HE-LTF between the HE-STF and the HE-SIG-B) in the example of FIG. 19, this should not be construed as limiting the scope of the present invention.

As described before, a plurality of STAs may simultaneously transmit PSDUs in a HE PPDU frame format on their allocated subchannels to an AP (i.e., referred to as UL MU-MIMO or OFDMA transmission or "UL MU transmission") and may simultaneously receive PSDUs in the HE PPDU frame format on their allocated subchannels from the AP (i.e., referred to as DL MU-MIMO or OFDMA transmission or "DL MU transmission").

Figure 15:
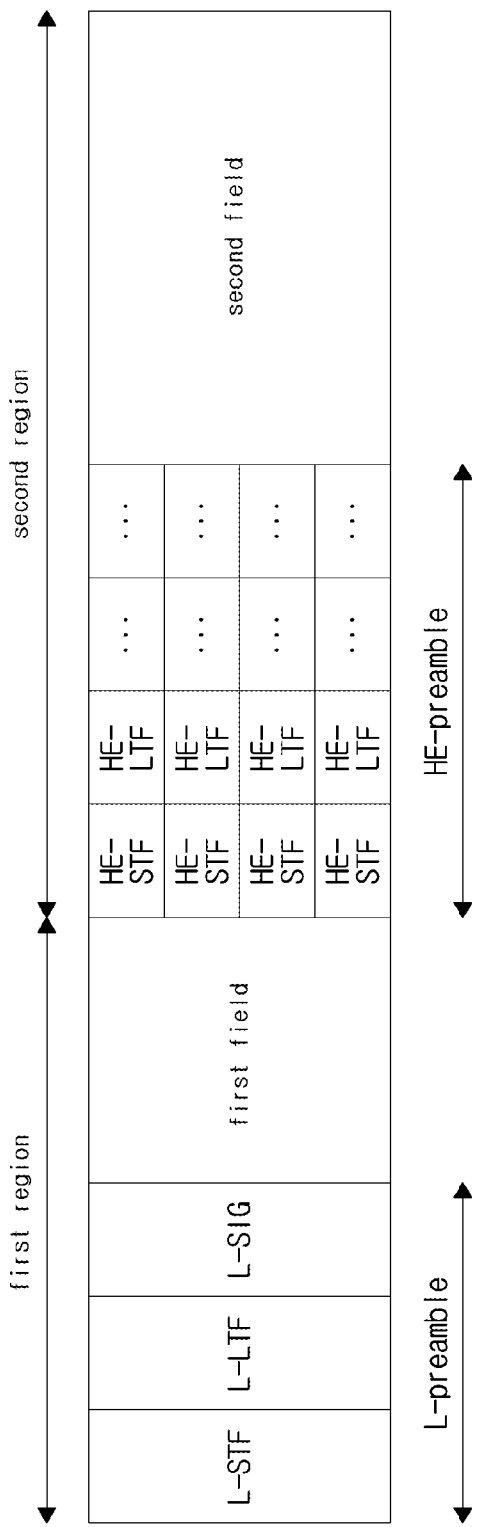
FIG. 15 depicts another exemplary HE PPDU frame format according to the present invention.

FIG. 15 depicts another exemplary HE PPDU frame format according to the present invention.

The exemplary HE PPDU format illustrated in FIG. 15 may be used for UL SU or MU transmission, or DL SU or MU transmission.

In FIG. 15, it is assumed that a HE PPDU frame is divided into two regions (i.e., a first region and a second region) having different types or properties. Or it may be said that the HE PPDU frame of FIG. 15 is configured by aggregating the first and second regions. Herein, the term region is purely exemplary and thus may be replaced with the terms, portion, part, period, field, and unit.

For example, the first region may be configured to be decodable by all STAs including a legacy STA and a HE STA, and the second region may be configured to be decodable by a HE STA. For example, the first region may not support UL/DL OFDMA transmission, whereas the second region may support UL/DL OFDMA transmission. Accordingly, the first region may be referred to as a legacy region and the second region may be referred to as a HE region.

For example, the first region may be a region including 64 FFT-based symbols (or symbols having a 3.2-μs symbol duration and a subcarrier spacing of 312.5 kHz). The second region may be a region including 256 FFT-based symbols (or symbols having a 12.8-μs symbol duration and a subcarrier spacing of 78.125 kHz).

Fields (e.g., L-STF, L-LTF, and L-SIG) expressed as a legacy preamble (L-preamble) in the first region have been described before with reference to FIGS. 7 to 14. Likewise, fields (e.g., H-STF, H-LTF, and H-SIG) expressed as a HE-preamble in the second region have been described before with reference to FIGS. 7 to 14.

A first field following the L-preamble of the first region (i.e., before the HE-preamble) may include a specific HE-SIG field. For example, the first field may include a field that provides control information needed for interpretation of the second region (e.g., a PPDU part configured in a HE format).

A second field following the HE-preamble of the second region may include PSDUs in various HE frame formats (e.g., control frame, data frame, and management frame). While not shown explicitly in the example of FIG. 15, the second field of the HE frame format may be configured to include a plurality of subchannels within one channel (i.e., a channel having a bandwidth of, for example, 20 MHz, 40 MHz, 80 MHz, or 160 MHz).

The HE PPDU frame format of the present invention can support simultaneous transmission from a plurality of STAs (e.g., UL MU transmission). A new method for controlling transmission power for collocation between a plurality of STAs will be described below.

For collocation between unlicensed devices in a 5 GHz unlicensed band, the following Federal Communications Commission (FCC) regulation requirement exists.

For mobile and portable client devices in a frequency band from 5.15 GHz to 5.25 GHz, if a maximum antenna gain does not exceed 6 dBi, a maximum conducted output power in an operation frequency band should not exceed 250 mW. Also, a Power Spectral Density (PSD) should not exceed 11 dBM in any 1-MHz band. If a transmission antenna having a directional gain above 6 dBi is used, both the maximum conducted output power and the maximum PSD should be reduced as much as the excess in dB of the directional gain of the antenna over 6 dBi.

In a band from 5.25 GHz to 5.35 GHz and a band from 5.47 GHz to 5.725 GHz, the maximum conducted output power in the operation frequency band should not exceed the smaller between 250 mW and 11 dBm log B (B is a 26-dB emission band in MHz). Further, the maximum PSD should not exceed 11 dBM in any 1-MHz band. If a transmission antenna having a directional gain above 6 dBi is used, both the maximum conducted output power and the maximum PSD should be reduced as much as the excess in dB of the directional gain of the antenna over 6 dBi.

In a band from 5.725 GHz to 5.85 GHz, the maximum conducted output power in the operation frequency band should not exceed 1 W. The maximum PSD should not exceed 30 dBm in any 500-kHz bad. If a transmission antenna having a directional gain above 6 dBi is used, both the maximum conducted output power and the maximum PSD should be reduced as much as the excess in dB of the directional gain of the antenna over 6 dBi. However, fixed point-to-point Unlicensed National Information Infrastructure (U-NII) devices operating in the band may use a transmission antenna having a directional gain above 6 dBi without any reduction of the transmission conducted power. A point-to-multi-point system, an omnidirectional application, and collocated transmitters that transmit the same information are excluded from a fixed point-to-point operation. A U-NII device operator or an installer that professionally installs a corresponding device should be responsible for ensuring exclusive use of a system with a high-gain directional antenna only for a fixed point-to-point operation.

To satisfy this FCC regulation requirement, an AP may perform transmission power control. Only one STA transmits a signal during a Transmission Opportunity (TXOP) in a legacy system (e.g., conforming to IEEE 802.11a/g/n/ac). Although the IEEE 802.11 ac system allows a single transmitting STA (e.g., an AP) to transmit different data to a plurality of destination STAs by supporting DL MU-MIMO, the entity that performs transmission is only one STA.

For transmission power control in single transmitter transmission or single transmitter channel access as is the case with the legacy system, the AP may provide a Transmit Power Envelope element to an STA. The Transmit Power Envelope element includes a maximum transmission power value defined for each of one or more channel bandwidths. The STA may determine a transmission power for the channel bandwidth of a PPDU to be transmitted to be a value satisfying a maximum transmission power defined in the Transmit Power Envelope element.

FIG. 16 illustrates a format of a VHT Transmit Power Envelope element.

If a VHT STA transmits a 20-MHz, 40-MHz, 80-MHz, 160-MHz, or 80+80-MHz VHT PPDU in the IEEE 802.11ac system, the VHT Transmit Power Envelope element may include information about a maximum transmission power value for each of the channel bandwidths.

An Element ID field may be set to a value indicating that this element is a VHT Transmit Power Envelope element.

A Length field may be set to a value indicating the length (e.g., in octets) of fields following the Length field.

A Transmit Power Information field may include subfields such as Local Maximum Transmit Power Count and Local Maximum Transmit Power Unit Interpretation.

The Local Maximum Transmit Power Count subfield may indicate a value obtained by subtracting 1 from the number of Local Maximum Transmit Power fields for XMHz (X=20, 40, 80, 160, or 80+80). For example, if the Local Maximum Transmit Power Count subfield is set to 2, this may imply inclusion of a Local Maximum Transmit Power field for 20 MHz, a Local Maximum Transmit Power field for 40 MHz, and a Local Maximum Transmit Power field for 80 MHz.

The Local Maximum Transmit Power Unit Interpretation subfield provides an additional interpretation about the unit of the Local Maximum Transmit Power fields for XMHz. For example, the Local Maximum Transmit Power Unit Interpretation subfield may be set to a value indicating an Equivalent Isotropically Radiated Power (EIRP) unit.

The Local Maximum Transmit Power fields for XMHz (X=20, 40, 80, 160, or 80+80) define transmission power limits for transmission in XMHz. Each of the Local Maximum Transmit Power fields for XMHz may be encoded to a signed 8-bit complementary number of 2, representing a value in units of 0.5 dBm in a range of −64 dBm to 63 dBm. 63.5 dBm represents 63.5 dBm or above (that is, this means that there is no limit on a local maximum transmission power).

Meanwhile, the HE PPDU frame format of the present invention may support transmission of different data from a plurality of transmitting STAs to a destination STA in a UL MU transmission scheme (e.g., UL MU-MIMO or UL OFDMA). For such multiple transmitter transmission or multiple transmitter channel access (or UL MU-MIMO or UL OFDMA) in the HE PPDU frame format, new transmission power control different from legacy transmission power may be required.

Figure 17:
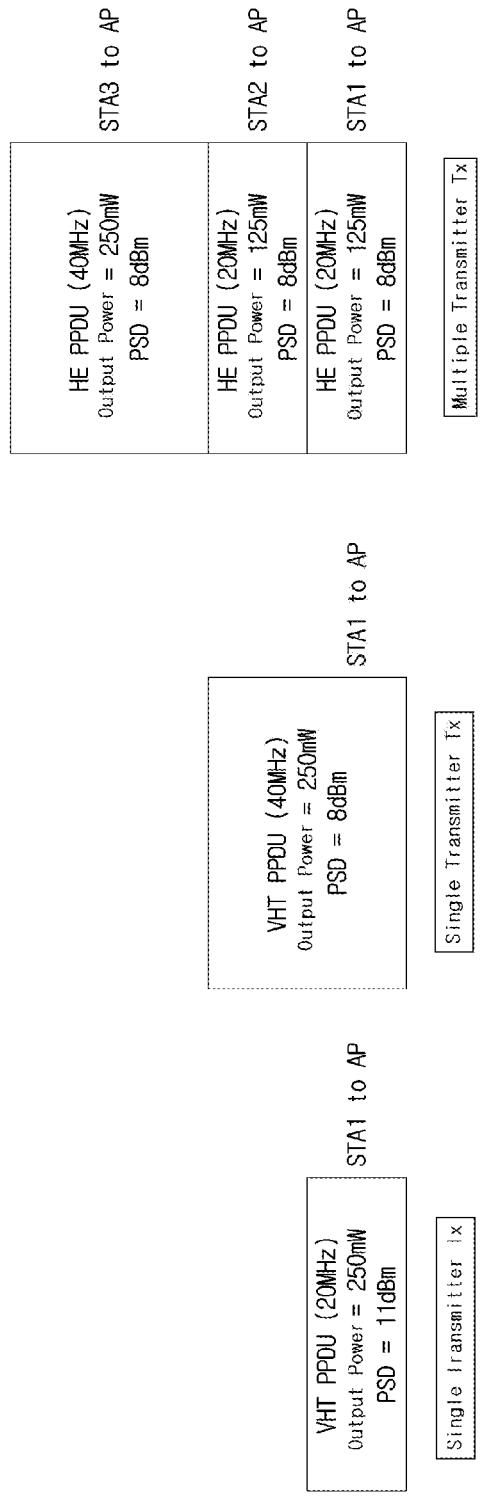
FIG. 17 depicts transmission power control according to an embodiment of the present invention.

FIG. 17 depicts transmission power control according to an embodiment of the present invention.

The left drawing of FIG. 17 illustrates transmission power control for single transmitter transmission. When STA1 transmits a VHT PPDU to an AP, STA1 may transmit the VHT PPDU on a primary channel in 20 MHz. Herein, the output power is 250 mW and the resulting PSD is 11 dBm. The middle drawing of FIG. 17 illustrates transmission power control for single transmitter transmission. When STA1 transmits a VHT PPDU to the AP, STA1 may transmit the VHT PPDU on the primary channel and a secondary channel in 40 MHz. Herein, the output power is 250 mW and the resulting PSD is 8 dBm. The output power for single transmitter power may be configured by providing a VHT Transmit Power Envelope element as illustrated in FIG. 16 to the STA by the AP. For example, the Local Maximum Transmit Power field for 20 MHz may be set to 250 mW and the Local Maximum Transmit Power field for 40 MHz may be set to 250 mW in the VHT Transmit Power Envelope element illustrated in FIG. 16.

The right drawing of FIG. 17 illustrates transmission power control for multiple transmitter transmission. It is assumed that the multiple transmitter transmission is, for example, OFDMA transmission. When STA1, STA2, and STA3 simultaneously transmit HE PPDUs to the AP, STA1, STA2, and STA3 may transmit a 20-MHz HE PPDU, a 20-MHz HE PPDU, and a 40-MHz HE PPDU, respectively on the primary channel and a secondary channel(s). Or it may be said that subchannel bandwidths of 20 MHz, 20 MHz, and 40 MHz on a channel having a total bandwidth of 80 MHz are allocated for UL OFDMA transmission of STA1, STA2, and STA3 in FIG. 17.

When a plurality of transmitting STAs (e.g., STA1, STA2, and STA3) transmit a plurality of PPDUs simultaneously to a destination STA (e.g., the AP), the PSDs of the PPDUs may be maintained equal or similar in order to increase the reception probabilities of the PPDUs at the destination STA. In the example of FIG. 17, while the HE PPDU transmission powers of the 20-MHz bandwidths of STA1 and STA2 may be set to 125 mW, the HE PPDU transmission power of the 40-MHz bandwidth of STA3 may be set to 250 mW. As a consequence, the PSDs of the respective PPDU transmissions are substantially equal, 8 dBm.

For this purpose, transmission power control information for multiple transmitter transmission (i.e., second transmission power control information) as well as transmission power control information for single transmitter transmission (i.e., first transmission power control information) may be provided to an STA capable of both single transmitter transmission and multiple transmitter transmission.

While STA1 applies a transmission power limit of 250 mW for the single transmitter transmission in 20 MHz, STA1 may apply a transmission power limit of 125 mW for the multiple transmitter transmission in 20 MHz in FIG. 17. That is, because a transmission power limit may not be imposed on multiple transmitter transmission just with the legacy VHT Transmit Power Envelope element illustrated in FIG. 16 (i.e., the first transmission power control information applied to single transmitter transmission), an additional Transmit Power Envelope element (i.e., the second transmission power control information) may be provided to the STA.

Accordingly, the STA may transmit a UL frame using one of the first transmission power control information and the second transmission power control information depending on whether the type (or PPDU-related UL transmission type) of a frame (i.e., PPDU) to be transmitted.

The value of the first transmission power control information for single transmitter transmission may be equal to or different from the value of the second transmission power control information for multiple transmitter transmission. Further, an output power for PPDU transmission corresponding to multiple transmitter transmission or multiple transmitter access (i.e., PPDU transmission of a second type) may not need to satisfy a Transmit Power Envelope value for single transmitter transmission (i.e., the value of the first transmission power control information). Likewise, an output power for PPDU transmission corresponding to single transmitter transmission or single transmitter access (i.e., PPDU transmission of a first type) may not need to satisfy a Transmit Power Envelope value for multiple transmitter transmission (i.e., the value of the second transmission power control information).

For example, if an AP supports both a legacy STA and a HE STA in the same BSS, the AP may need to support both single transmitter transmission of the legacy STA and multiple transmitter transmission of the HE STA. For this purpose, the AP may transmit a Transmit Power Envelope element for single transmitter transmission (i.e., the first transmission power control information) and a Transmit Power Envelope element for multiple transmitter transmission (i.e., the second transmission power control information) to the STAs. Upon receipt of both the first transmission power control information and the second transmission power control information, the HE STA determines the output power of a PPDU to be transmitted to be a value satisfying a maximum transmission power value for each of single transmitter transmission and multiple transmitter transmission depending on whether the type of the PPDU or a transmission type (or access type) related to the PPDU is single transmitter transmission or multiple transmitter transmission.

The STA may determine whether its UL frame (or PPDU type) or frame-related transmission type (or access type) is single transmitter transmission or multiple transmitter transmission, based on scheduling information received in a trigger frame for the UL transmission.

Figure 18:
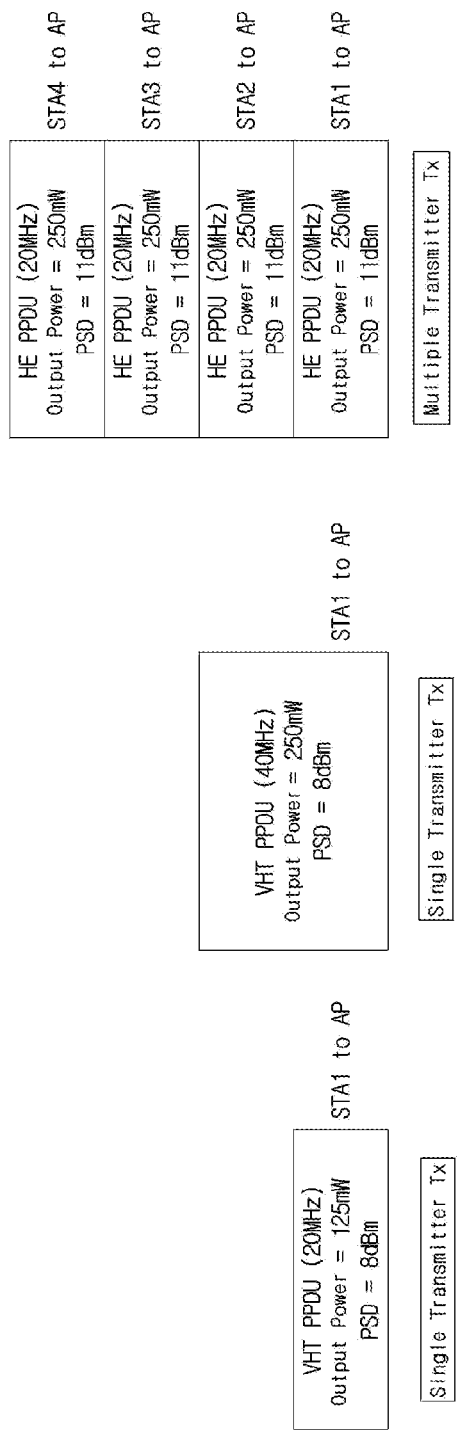
FIG. 18 depicts transmission power control according to another embodiment of the present invention.

FIG. 18 depicts transmission power control according to another embodiment of the present invention.

The left drawing of FIG. 18 illustrates transmission power control for single transmitter transmission. When STA1 transmits a VHT PPDU to an AP, STA1 may transmit the VHT PPDU on a primary channel in 20 MHz. Herein, the output power is 125 mW and the resulting PSD is 8 dBm. The middle drawing of FIG. 18 illustrates transmission power control for single transmitter transmission. When STA1 transmits a VHT PPDU to the AP, STA1 may transmit the VHT PPDU on the primary channel and a secondary channel in 40 MHz. Herein, the output power is 250 mW and the resulting PSD is 8 dBm. The output power for single transmitter power may be configured by providing first transmission power control information (e.g., a VHT Transmit Power Envelope element as illustrated in FIG. 16) to the STA by the AP. For example, the Local Maximum Transmit Power field for 20 MHz may be set to 125 mW and the Local Maximum Transmit Power field for 40 MHz may be set to 250 mW in the VHT Transmit Power Envelope element illustrated in FIG. 16.

The right drawing of FIG. 18 illustrates transmission power control for multiple transmitter transmission. It is assumed that the multiple transmitter transmission is, for example, OFDMA transmission. When STA1, STA2, STA3, and STA4 simultaneously transmit HE PPDUs to the AP, STA1, STA2, STA3, and STA4 may transmit a 20-MHz HE PPDU, a 20-MHz HE PPDU, a 20-MHz HE PPDU, and a 20-MHz HE PPDU, respectively on the primary channel and a secondary channel(s). Or it may be said that subchannel bandwidths of 20 MHz, 20 MHz, 20 MHz, and 20 MHz on a channel having a total bandwidth of 80 MHz are allocated for UL OFDMA transmission of STA1, STA2, STA3, and STA4 in FIG. 18.

In the example of FIG. 18, the PSDs of the PPDUs transmitted by the plurality of transmitting STAs may be maintained equal or similar. For this purpose, the transmission powers of the PPDUs transmitted by STA1, STA2, STA3, and STA4 may be equally set to 250 mW. The output power for the multiple transmitter transmission may be configured by providing second transmission power control information for PPDU transmission of the second type (i.e., multiple transmitter transmission or multiple transmitter access) to the STAs by the AP. For example, the Local Maximum Transmit Power field for 20 MHz may be set to 250 mW in the second transmission power control information.

As described above, the value of the first transmission power control information for single transmitter transmission may be different from the value of the second transmission power control information for multiple transmitter transmission. In the example of FIG. 18, while the Local Maximum Transmit Power field for 20 MHz may be set to 125 mW in the first transmission power control information, the Local Maximum Transmit Power field for 20 MHz may be set to 250 mW in the second transmission power control information.

While it has been described above with reference to the examples of FIGS. 17 and 18 that local maximum transmission powers are set for the legacy channel bandwidth units (e.g., 20 MHz, 40 MHz, 80 MHz, 160, and 80+80 MHz), OFDMA transmission may be performed on a plurality of subchannels each having a smaller bandwidth than the channel bandwidth (e.g., 20 MHz) of one channel, for multiple transmitter transmission. Therefore, the present invention can support subchannel units (e.g., 2.5 MHz, 5 MHz, 10 MHz, 20 MHz, 40 MHz, and 80 MHz) as bandwidth units for which local maximum transmission power is set in the second transmission power control information for PPDU transmission of the second type (i.e., multiple transmitter transmission or multiple transmitter access).

FIG. 19 depicts transmission power control for multiple transmitter transmission according to the present invention.

The example of FIG. 19 shows transmission power control for multiple transmitter transmission. For example, it is assumed that multiple transmitter transmission is OFDMA transmission. When STA1, STA2, STA3, and STA4 transmit HE PPDUs simultaneously to an AP, they may transmit a 5-MHz HE PPDU, a 5-MHz HE PPDU, a 5-MHz HE PPDU, and a 5-MHz HE PPDU, respectively on a primary channel and a secondary channel(s). It may be said that the UL OFDMA transmission of STA1, STA2, STA3, and STA4 in FIG. 19 corresponds to the case where subchannel bandwidths of 5 MHz, 5 MHz, 5 MHz, and 5 MHz are allocated in a channel having a total bandwidth of 20 MHz. It may be said that 256 FFT is applied to one channel (i.e., a 20-MHz channel) and 64 FFT is applied to each subchannel (i.e., a 5-MHz subchannel).

Further, the PSDs of the plurality of PPDUs transmitted by the plurality of transmitting STAs may be maintained equal or similar in the example of FIG. 19. For this purpose, the transmission power of each of the PPDUs transmitted by STA1, STA2, STA3, and STA4 may be set to 62.5 mW. The output power for multiple transmitter power may be configured by providing second transmission power control information for PPDU transmission of the second type (i.e., multiple transmitter transmission or multiple transmitter access) to the STAs by the AP. For example, the value of the Local Maximum Transmit Power field for 5 MHz may be set to 62.5 mW in the second transmission power control information.

Figure 20:
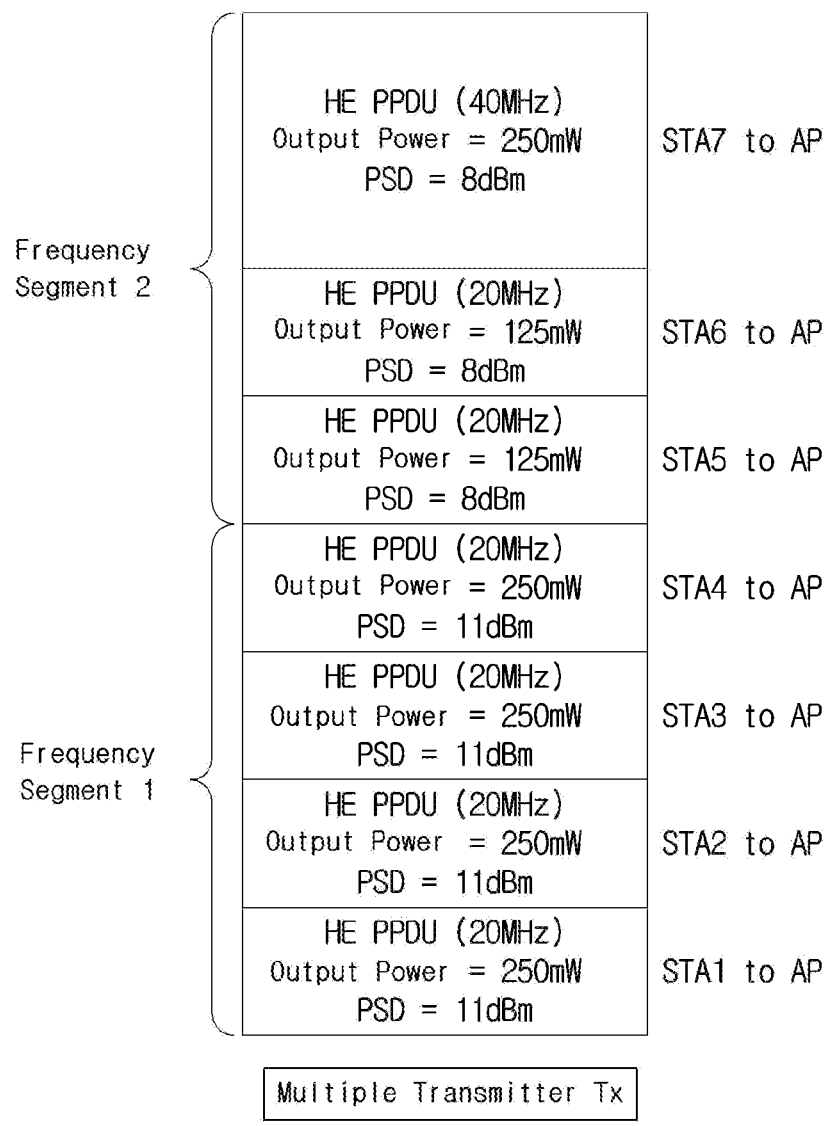
FIG. 20 illustrates transmission power control for multiple transmitter transmission.

FIG. 20 depicts transmission power control for multiple transmitter transmission according to the present invention.

For multiple transmitter transmission, OFDMA transmission from a plurality of transmitters may be supported by configuring a plurality of frequency segments and allocating a plurality of subchannels in each of the frequency segments.

The example of FIG. 29 illustrates two frequency segments each having a bandwidth of 80 MHz (frequency segment 1 and frequency segment 2) that belong to one 80+80 MHz channel. Four 20-MHz subchannels are allocated in frequency segment 1, and two 20-MHz subchannels and one 40-MHz subchannel are allocated in frequency segment 2.

The example of FIG. 20 illustrates transmission power control for multiple transmitter transmission. For example, it is assumed that the multiple transmitter transmission is OFDMA transmission. When STA1, STA2, STA3, STA4, STA5, STA6, and STA7 transmit HE PPDUs simultaneously to the AP, they may transmit a 20-MHz HE PPDU, a 20-MHz HE PPDU, a 20-MHz HE PPDU, a 20-MHz HE PPDU, a 20-MHz HE PPDU, a 20-MHz HE PPDU, and a 40-MHz HE PPDU, respectively on a primary channel and a secondary channel(s).

Further, the PSDs of a plurality of PPDUs transmitted in the same frequency segment by a plurality of transmitting STAs may be maintained equal or similar in the example of FIG. 20. This is because different maximum transmission power values may be allowed for different frequency positions according to the regulation requirement. That is, even though HE PPDUs are transmitted in the same channel bandwidth (or subchannel bandwidth), the output powers of the HE PPDUs may be set to different values according to frequency positions (e.g., frequency segments) to which corresponding channels (or subchannels) belong.

In the example of FIG. 20, the transmission power of each of the PPDUs transmitted by STA1, STA2, STA3, and STA4 allocated to frequency segment 1 may be set to 250 mW. Therefore, the same PSD, 11 dBm may be applied to the four subchannels in frequency segment 1. Further, the transmission powers of the PPDUs transmitted by STA5, STA6, and STA7 allocated to frequency segment 2 may be set respectively to 125 mW, 125 mW, and 250 mW. Therefore, the same PSD, 8 dBm may be applied to the three subchannels in frequency segment 2.

The output power for the above-described multiple transmitter power may be configured by providing second transmission power control information for PPDU transmission of the second type (i.e., multiple transmitter transmission or multiple transmitter access) to the STAs by the AP. For example, the Local Maximum Transmit Power field for 20 MHz in frequency segment 1 may be set to 250 mW, and the Local Maximum Transmit Power fields for 20 MHz and 40 MHz in frequency segment 2 may be set respectively to 125 mW and 250 mW, in the second transmission power control information.

FIG. 21 depicts a format of a HE Transmit Power Envelope element.

The HE Transmit Power Envelope element illustrated in FIG. 21 may correspond to an example of the afore-described second transmission power control information for PPDU transmission of the second type (i.e., multiple transmitter transmission or multiple transmitter access).

The HE Transmit Power Envelope element may include information about a maximum transmission power value for each channel (or subchannel) bandwidth, when a HE STA transmits a HE PPDU corresponding to XMHz in a specific frequency segment. For example, A, B, C, D, E, F MHz, . . . which are examples of XMHz may be 2.5 MHz, 5 MHz, 10 MHz, 20 MHz, 40 MHz, 80 MHz, . . . .

An Element ID may be set to a value indicating that this element is a HE Transmit Power Envelope element.

A Length field may be set to a value indicating the length (in octets) of fields following the Length field.

A Frequency Segment Index field may indicate the index (e.g., center frequency) of a frequency segment to which an X-MHz channel (or subchannel) of the following Local Maximum Transmit Power field for XMHz belongs.

The Local Maximum Transmit Power fields for XMHz (X=2.5, 5, 10, 20, 40, 80, . . . ) define transmission power limits for transmission in XMHz, when multiple transmitter transmission (e.g., UL MU-MIMO or UL OFDMA transmission) is performed. Each of the Local Maximum Transmit Power fields for XMHz may be encoded to a signed 8-bit complementary value of 2, indicating a value in units of 0.5 dBM in a range from −64 dBm to 63 dBm. 63.5 dBm means 63.5 dBm or above (i.e., it means that there is no limit on a local maximum transmission power).

The second transmission power control information for PPDU transmission of the second type (i.e., multiple transmitter transmission or multiple transmitter access) may be provided to an STA(s) in a management frame such as a beacon frame or a probe response frame. Or to apply transmission power control on a TXOP basis, the second transmission power control information may be included in a control frame such as an RTS/CTS frame. Or to apply per-frame transmission power control, the second transmission power control information may be included as a control field in the MAC header of a PSDU of a frame (e.g., a trigger frame including scheduling information for UL transmission).

The second transmission power control information for PPDU transmission of the second type (i.e., multiple transmitter transmission or multiple transmitter access) may be defined in units of dBm indicating an absolute value or in units of dB indicating a value relative to a predetermined reference value. If the second transmission power control information is defined as a relative value, the Local Maximum Transmit Power field for XMHz in the first transmission power control information (e.g., the VHT Transmit Power Envelope element illustrated in FIG. 16) for PPDU transmission of the first type (i.e., single transmitter transmission or single transmitter access) may be used as the predetermined reference value. In any case in which the second transmission power control information has an absolute value or a relative value, the second transmission power control information may be provided in a management frame such as a beacon frame or a probe response frame, in a control frame such as an RTS/CTS frame, or as a control information field of the MAC header of a frame.

Further, even though the first transmission power control information for PPDU transmission of the first type (i.e., single transmitter transmission or single transmitter access) and the second transmission power control information for PPDU transmission of the second type (i.e., multiple transmitter transmission or multiple transmitter access) are correlated (e.g., even though the value of the second transmission power control information is set as a relative value with respect to the value of the first transmission power control information), the first and second transmission control information is separately applied. That is, the output power for PPDU transmission corresponding to multiple transmitter transmission or multiple transmitter access (i.e., of the second type) has only to satisfy the value of the second transmission power control information, not needing to satisfy the value of the first transmission power control information. Likewise, the output power for PPDU transmission corresponding to single transmitter transmission or single transmitter access (i.e., of the single type) has only to satisfy the value of the single transmission power control information, not needing to satisfy the value of the second transmission power control information.

Figure 22:
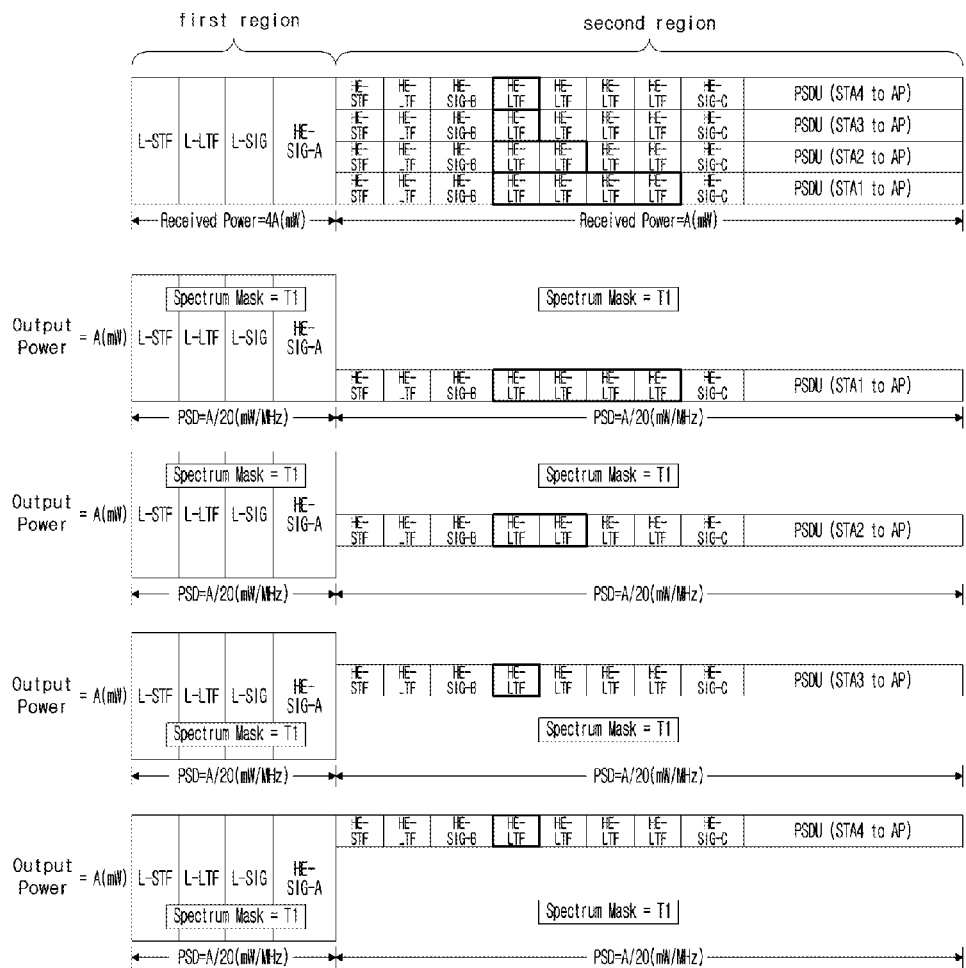
FIGS. 22 and 23 depict transmission spectrum masks applied to HE PPDU transmission according to the present invention.
Figure 23:
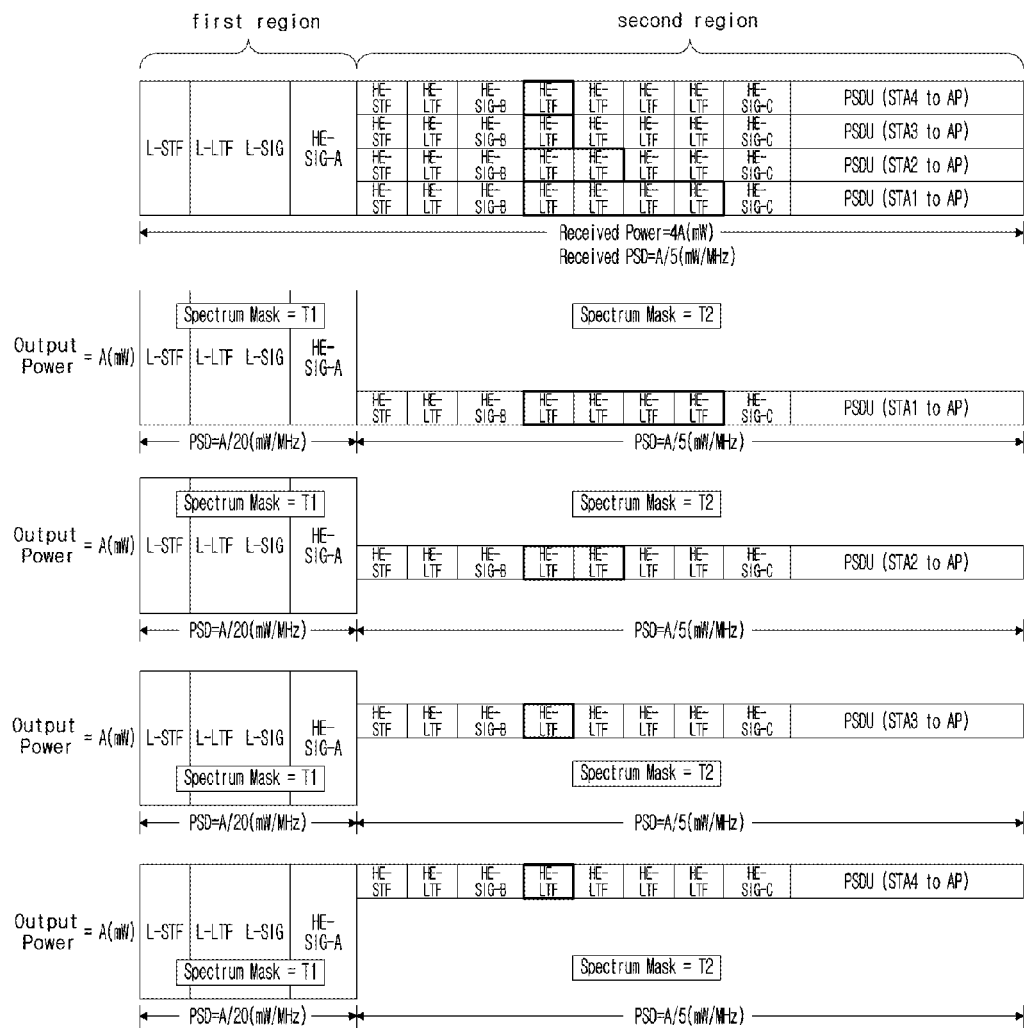

FIGS. 22 and 23 depict transmission spectrum masks applied to HE PPDU transmission according to the present invention.

FIGS. 22 and 23 illustrate exemplary masks that an STA uses in a UL HE PPDU frame format. A spectrum mask may be defined in various forms and is a significant factor that determines the PSD of a HE PPDU that the STA transmits. The spectrum mask is defined as a set of mathematically defined lines applied to a wireless transmission level (or an optical transmission level). The spectrum mask may be referred to as a channel mask or a transmission mask. In general, the spectrum mask may use a band pass filter and may be used for the purpose of reducing adjacent-channel interference by restricting excessive emission in a frequency outside a necessary bandwidth.

While the first region of the HE PPDU frame format is shown in FIGS. 22 and 23 as including the L-preamble (i.e., L-STF, L-LTF, and L-SIG) and the HE-SIG-A field, this does not limit the present invention. When the first region includes the L-preamble and the first field as illustrated in FIG. 15, the examples of the present invention described with reference to FIGS. 22 and 23 may be applied in the same manner. Further, while the second region of the HE PPDU frame format is shown in FIGS. 22 and 23 as including the HE-preamble (i.e., one or more of HE-STF, HE-LTF, HE-SIG-B, and HE-SIG-C) and a PSDU, this does not limit the present invention. When the second region includes the HE-preamble and the second field as illustrated in FIG. 15, the examples of the present invention described with reference to FIGS. 22 and 23 may be applied in the same manner.

In the example of FIG. 22, each of STA1, STA2, STA3, and STA4 is allocated to one subchannel (e.g. a 5-MHz subchannel) within one channel (e.g., a 20-MHz channel) by an AP and STA1, STA2, STA3, and STA4 simultaneously transmit UL HE PPDUs on the allocated subchannels.

Herein, it is assumed that the output power of an STA is A mW for transmission on a 20-MHz channel. It is also assumed that the same spectrum mask T1 is used as a first spectrum mask applied to the first region of a HE PPDU and a second spectrum mask applied to the second region of the HE PPDU. A characteristic value (or allowed PSD) of the spectrum mask T1 is assumed to be A/20 mW/MHz.

STA1, STA2, STA3, and STA4 may perform transmission corresponding to the first region (i.e., the L-preamble and the first field (e.g., the HE-SIG-A field)) of a HE PPDU on the same channel (e.g., a 20-MHz channel). Since the plurality of STAs transmit the same first regions on the same channel, a receiver (i.e., the AP) may consider that one STA has transmitted the L-preamble and the first field four times redundantly.

The allowed PSD of the first spectrum mask t1 applied to the first region of the HE PPDU of each STA is A/20 mW/MHz. Therefore, the total received power of the first region that the AP receives from the four STAs redundantly is 4 A mW (=4×20 MHz×PSD(=A×T1/20 mW/MHz)).

Each of STA1, STA2, STA3, and STA4 may perform transmission corresponding to the second region of the HE PPDU on its allocated subchannel (e.g., a 5-MHz subchannel). Since the plurality of STAs transmit second regions on different subchannels, only a HE-preamble and a second field from one STA are transmitted on each subchannel and there is no frequency band in which overlapped transmission takes place.

The allowed PSD of the second spectrum mask t1 applied to the second region of the HE PPDU of each STA is A/20 mW/MHz. Therefore, the total received power of the second regions that the AP receives from the four STAs is the sum A mW (=4×5 MHz×PSD(=A/20 mW/MHz)) of the received power 5 MHz×PSD of a first subchannel, the received power 5 MHz×PSD of a second subchannel, the received power 5 MHz×PSD of a third subchannel, and the received power 5 MHz×PSD of a fourth subchannel.

Although the allowed PSDs of each STA are equal in the first and second regions (i.e., the same spectrum mask is used in the first and second regions), the transmission bandwidth (occupied bandwidth) of the STA is 20 MHz in the first region but reduced to a fourth of 20 MHz, 5 MHz in the second region. Therefore, the output power of the STA is reduced to a ¼ of the output power of the first region in the second region. As a consequence, the AP receives the HE PPDUs from the four STAs with 4 A mW in the first region but with A mW in the second region. That is, because the AP receives a signal with a PSD of A/20 mW/MHz overlapped with itself four times in the first region, the AP has a received power of 4 A mW in the bandwidth of one channel. However, the AP receives a signal with a PSD of A/20 mW/MHz in each of four subchannel bandwidths without signal overlap in the second region and thus has a received power of A mW in the bandwidth of the one channel.

From the view point of the AP's reception of a HE PPDU, the received signal power of one channel (i.e. 20 MHz) is 4 A mW in the first region of the HE PPDU and thus the received PSD of the first region is 4 A/20 (=A/5 mW/MHz), whereas the received signal power of one channel corresponding to a plurality of subchannels is A mW in the second region of the HE PPDU and thus the received PSD of the second region is A/20 mW/MHz.

If the same spectrum mask is applied to the total transmission period of one HE PPDU (i.e., both the first and second regions of the HE PPDU) as illustrated in the example of FIG. 22, the transmission power and received power of the second region are reduced greatly, relative to the transmission power and received power of the first region. As a consequence, the PSD of the second region is decreased significantly relative to the PSD of the first region (the PSD is decreased from 4 A mW/MHz to A mW/MHz by 6 dB in the example of FIG. 22). If the received power is reduced greatly in one HE PPDU as described above, the AP may fail to receive the UL HE PPDU due to an error such as carrier loss.

To avert this problem, different spectrum masks may be used for the first and second regions so that STAs may transmit a UL HE PPDU with the same output power across the total transmission period (both the first and second regions) of the UL HE PPDU and the AP may receive the UL HE PPDU with the same output power, according to the present invention.

In the example of FIG. 23, each of STA1, STA2, STA3, and STA4 is allocated to one subchannel (e.g., a 5-MHz subchannel) within one channel (e.g., a 20-MHz channel) by an AP and the plurality of STAs transmit a UL HE PPDU simultaneously on their allocated subchannels.

It is assumed herein that the output power of an STA is A mW for transmission on the 20-MHz channel. It is also assumed that a first spectrum mask T1 is applied to the first region of a HE PPDU (the characteristic value (or allowed PSD) of the spectrum mask T1 is A/20 mW/MHz) and a second spectrum mask T2 is applied to the second region of the HE PPDU (the characteristic value (or allowed PSD) of the spectrum mask T2 is A/5 mW/MHz).

In other words, if the transmission bandwidth (occupied bandwidth) of the second region is smaller than the transmission bandwidth (occupied bandwidth) of the first region in the HE PPDU, the characteristic value (or allowed PSD) of the spectrum mask applied to the first region may be set to be larger than the characteristic value (or allowed PSD) of the spectrum mask applied to the second region. For example, the ratio of the transmission bandwidth (or occupied bandwidth) of the second region to the transmission bandwidth (or occupied bandwidth) of the first region in the HE PPDU may be set to be equal to the ratio of the characteristic value (or allowed PSD) of the spectrum mask applied to the first region to the characteristic value (or allowed PSD) of the spectrum mask applied to the second region.

STA1, STA2, STA3, and STA4 may perform transmission corresponding to the first region (i.e., the L-preamble and the first field (e.g., HE-SIG-A) of a HE PPDU on the same channel (e.g., a 20-MHz channel). Since the plurality of STAs transmits the same first region on the same channel, a receiver (i.e., the AP) may consider that it receives the L-preamble and the first field four times redundantly, from the viewpoint of reception.

The characteristic value (or allowed PSD) of the first spectrum mask T1 applied to the first region of the HE PPDU of each STA is A/20 mW/MHz. Accordingly, the total received power of the first region that the AP receives redundantly from the four STAs is 4 A mW (=4×20 MHz× PSD(=A×T1/20 mW/MHz)).

Each of STA1, STA2, STA3, and STA4 may perform transmission corresponding to the second region of the HE PPDU on its allocated subchannel (e.g., a 5-MHz subchannel). Since the plurality of STAs transmit second regions on different subchannels, only a HE-preamble and a second field from one STA are transmitted on each subchannel and there is no frequency band in which overlapped transmission takes place.

The characteristic value (or allowed PSD) of the second spectrum mask t2 applied to the second region of the HE PPDU of each STA is A/5 mW/MHz. Therefore, the total received power of the second regions that the AP receives from the four STAs is the sum 4 A mW (=4×5 MHz×PSD (=A/5 mW/MHz)) of the received power 5 MHz×PSD of a first subchannel, the received power 5 MHz×PSD of a second subchannel, the received power 5 MHz×PSD of a third subchannel, and the received power 5 MHz×PSD of a fourth subchannel.

If the allowed PSDs of each STA are different in the first and second regions (i.e., different spectrum masks are used in the first and second regions), the transmission bandwidth (occupied bandwidth) of the STA is 20 MHz in the first region but reduced to a fourth of 20 MHz, 5 MHz in the second region. Nonetheless, the output power of the STA may be maintained equal in the first and second regions. Accordingly, the AP receives the HE PPDUs from the four STAs with 4 A mW in the first region but and also with 4 A mW in the second region. That is, because the AP receives a signal with a PSD of A/20 mW/MHz four times redundantly in the first region, the AP has a received power of 4 A mW in the bandwidth of one channel (e.g., 20 MHz). However, the AP receives a signal with a PSD of A/5 mW/MHz in each of four subchannel bandwidths without signal overlap in the second region and thus has a received power of 4 A mW in the bandwidth of one channel (e.g., 20 MHz).

From the view point of the AP's reception of a HE PPDU, the received signal power of one channel (i.e. 20 MHz) is 4 A mW in the first region of the HE PPDU and thus the received PSD of the first region is 4 A/20 (=A/5 mW/MHz), whereas the received signal power of one channel corresponding to a plurality of subchannels is 4 A mW in the second region of the HE PPDU and thus the received PSD of the second region is 4 A/20 mW/MHz (=A/5 mW/MHz). In this manner, when the AP receives a HE PPDU, the received PSD is maintained equal in the first and second regions. Therefore, the AP may receive the HE PPDU more stably.

In the method for configuring spectrum masks for the first and second regions of a HE PPDU as described above with reference to the examples of FIGS. 22 and 23, the transmission power of the HE PPDU may be set based on a maximum transmission power set by transmission power control information for multiple transmitter transmission in the examples described with reference to FIGS. 17 to 21. For example, the HE PPDU transmission power of each STA in multiple transmitter transmission or multiple transmitter access (i.e., the second type) may be set based on the HE Transmit Power Envelope element illustrated in FIG. 21.

For example, the Local Maximum Transmit Power field for 5 MHz may be given as A mW in the second transmission power control information. That is, an STA may be configured to apply an output power of up to A mW for transmission in a transmission bandwidth of 5 MHz in the second region of a HE PPDU. In this case, the same output power of A mW may be applied for transmission on one channel (e.g., a 20-MHz channel) in the first region of the HE PPDU. Herein, the allowed PSD of the first spectrum mask applied to the first region of the HE PPDU may be set to A/20 mW/MHz, and the allowed PSD of the second spectrum mask applied to the second region of the HE PPDU may be set to A/5 mW/MHz, taking into account the ratio between the transmission bandwidths of the first and second regions.

Figure 24:
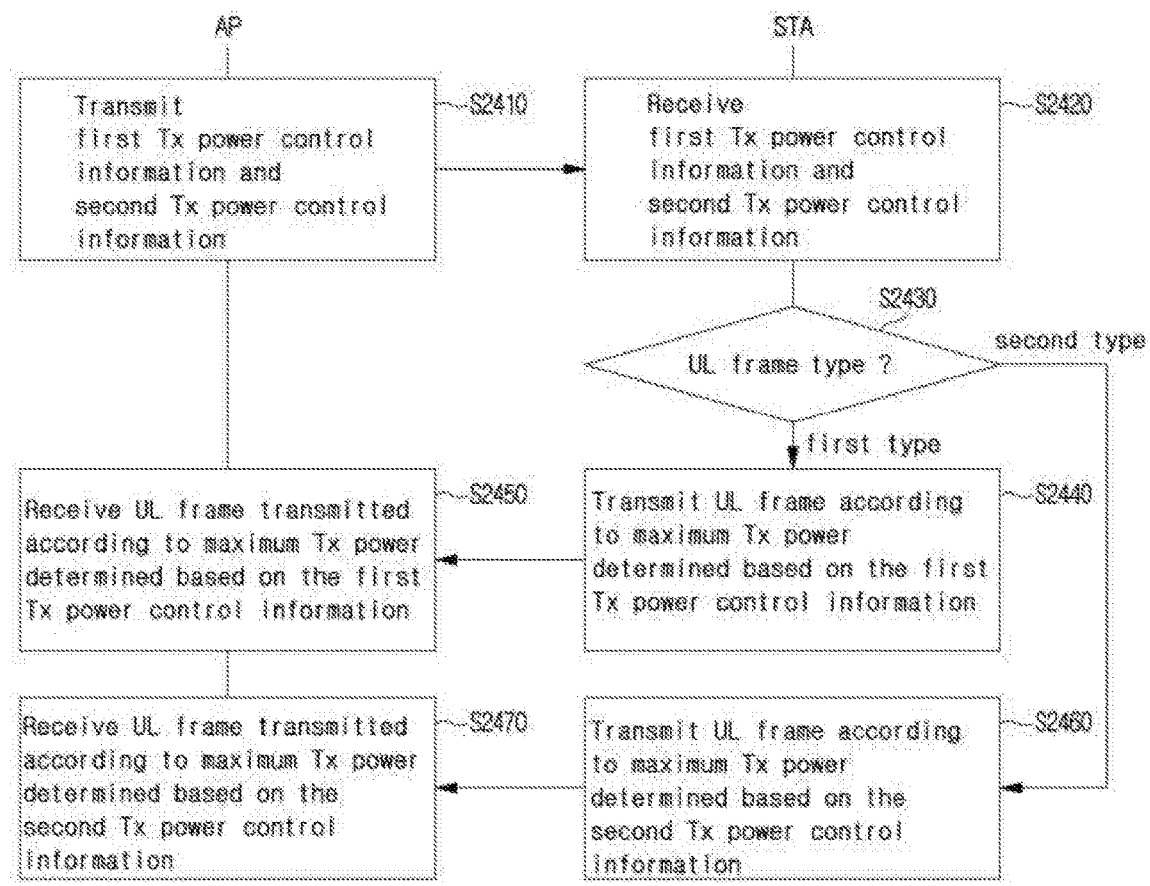
FIG. 24 is a flowchart illustrating an exemplary method according to the present invention.

FIG. 24 is a flowchart illustrating an exemplary method according to the present invention.

In step S2410, an AP may provide first transmission power control information applied to a first type (e.g., single transmitter transmission or single transmitter access) and second transmission power control information applied to a second type (e.g., multiple transmitter transmission or multiple transmitter access) to a plurality of STAs.

In step S2420, the plurality of STAs may receive the first and second transmission power control information.

If a UL frame that an STA will transmit is of the first type in step S2430, the STA may determine a maximum transmission power based on the first transmission power control information and transmit the UL frame accordingly in step S2440. In step S2450, the AP may receive the UL frame transmitted based on the first transmission power control information by the STA.

On the other hand, if a UL frame that the STA will transmit is of the second type in step S2430, the STA may determine a maximum transmission power based on the second transmission power control information and transmit the UL frame accordingly in step S2460. One or more other STAs may perform transmission simultaneously with the STA (i.e. multiple transmitter transmission). In step S2470, the AP may receive the UL frame transmitted based on the second transmission power control information by the STA.

Herein, each of the plurality of STAs participating in the multiple transmitter transmission may determine a maximum transmission power for the bandwidth of a subchannel allocated to the STA based on the second transmission power control information. The maximum transmission power determined based on the second transmission power control information may be applied commonly to the first region (e.g., a region including a L-preamble and 64 FFT-based OFDM symbols) and the second region (e.g., a region including a HE-preamble and 256 FFT-based OFDM symbols) of a HE PPDU frame format used for the multiple transmitter transmission. Further, different spectrum masks may be applied to the first and second regions of the UL HE PPDU transmitted by the STA and thus different allowed PSDs (or transmission PSDs) may be applied to the first and second regions. Also, the same received power and the same received PSD may be maintained in the first and second regions of the UL HE PPDU that the AP receives from the plurality of STAs.

While the exemplary method has been described with reference to FIG. 24 as a series of operations for simplicity of description, this does not limit the sequence of steps. When needed, steps may be performed at the same time or in a different sequence. All of the exemplary steps are not always necessary to implement the method proposed by the present invention.

The foregoing embodiments of the present invention may be implemented separately or combinations of two or more of the embodiments may be implemented simultaneously, for the method of FIG. 24.

The present invention includes an apparatus for processing or performing the method of the present invention (e.g., the wireless device and its components described with reference to FIGS. 1, 2, and 3).

The present invention includes software (an operating system (OS), an application, firmware, a program, etc.) for executing the method of the present invention in a device or a computer, and a medium storing the software that can be executed in a device or a computer.

While various embodiments of the present invention have been described in the context of an IEEE 802.11 system, they are applicable to various mobile communication systems.

What is claimed is:

1. A method for transmitting an uplink frame to an Access Point (AP) by a Station (STA) in a Wireless Local Area Network (WLAN) system, the method comprising:
receiving first transmission power control information and second transmission power control information from the AP;
if a type related to the uplink frame is a first type, determining a maximum transmission power based on the first transmission power control information, and if the type related to the uplink frame is a second type, determining a maximum transmission power based on the second transmission power control information; and
transmitting the uplink frame based on the determined maximum transmission power,
wherein the first type and the second type correspond to different access schemes for uplink transmission, and
wherein if the type related to the uplink frame is the second type, transmission of the STA and transmissions of one or more other STAs are performed simultaneously on one same channel in a first region of the uplink frame, and transmission of the STA on one subchannel within the one channel and transmissions of the one or more other STAs on one or more different subchannels within the one channel are performed simultaneously in a second region of the uplink frame.

2. The method according to claim 1, wherein the first type corresponds to single transmitter transmission, and the second type corresponds to multiple transmitter transmission.

3. The method according to claim 1, wherein the uplink frame is transmitted based on a trigger frame received from the AP, and the type related to the uplink frame is determined based on information included in the trigger frame.

4. The method according to claim 1, wherein the first transmission power control information includes maximum transmission power information for each of one or more transmission bandwidths, and
wherein the second transmission power control information includes transmission power control information for each of one or more frequency positions, and transmission power control information for a frequency position includes maximum transmission power information for each of one or more transmission bandwidths.

5. The method according to claim 1, wherein maximum transmission power information included in the second transmission power control information is set to a relative value with respect to the first transmission power control information.

6. The method according to claim 1, wherein a transmission power determined based on the second transmission power control information is applied commonly to the first and second regions, and different spectrum masks are applied to the first and second regions, for the transmission of the STA.

7. The method according to claim 1, wherein an allowed Power Spectrum Density (PSD) of the first region is smaller than an allowed PSD of the second region, for the transmission of the STA.

8. The method according to claim 7, wherein a ratio of the allowed PSD of the second region to the allowed PSD of the first region is equal to a ratio of the bandwidth of the one channel to the bandwidth of the one subchannel, for the transmission of the STA.

9. The method according to claim 1, wherein the first region includes 64 Fast Fourier Transform (FFT)-based Orthogonal Frequency Division Multiplexing (OFDM) symbols, and the second region includes 256 FFT-based OFDM symbols.

10. A method for receiving an uplink frame from a plurality of Stations (STAs) by an Access Point (AP) in a Wireless Local Area Network (WLAN) system, the method comprising:
   transmitting first transmission power control information and second transmission power control information to the plurality of STAs;
   if a type related to the uplink frame is a first type, receiving the uplink frame from one STA according to a maximum transmission power determined based on the first transmission power control information; and
   if the type related to the uplink frame is a second type, receiving the uplink frame from the plurality of STAs according to a maximum transmission power determined based on the second transmission power control information,
   wherein the first type and the second type correspond to different access schemes for uplink transmission, and
   wherein if the type related to the uplink frame is the second type, the plurality of STAs perform simultaneous transmission on one same channel in a first region of the uplink frame, and the plurality of STAs perform simultaneous transmission on a plurality of subchannels within the one channel in a second region of the uplink frame.

11. The method according to claim 10, wherein the first type corresponds to single transmitter transmission and the second type corresponds to multiple transmitter transmission.

12. The method according to claim 10, wherein the uplink frame is transmitted based on a trigger frame provided by the AP, and the type related to the uplink frame is determined based on information included in the trigger frame.

13. The method according to claim 10, wherein the first transmission power control information includes maximum transmission power information for each of one or more transmission bandwidths, and
   wherein the second transmission power control information includes transmission power control information for each of one or more frequency positions, and transmission power control information for one frequency position includes maximum transmission power information for each of one or more transmission bandwidths.

14. The method according to claim 10, wherein maximum transmission power information included in the second transmission power control information is set to a relative value with respect to the first transmission power control information.

15. The method according to claim 10, wherein a received power of the first region is equal to a received power of the second region in the uplink frame received by the AP, and a received Power Spectrum Density (PSD) of the first region is equal to a received PSD of the second region in the uplink frame received by the AP.

16. The method according to claim 10, wherein an allowed PSD of the first region is set to smaller than an allowed PSD of the second region, for transmission of each of the plurality of STAs.

17. The method according to claim 16, wherein a ratio of the allowed PSD of the second region to the allowed PSD of the first region for the transmission of each of the plurality of STAs is equal to a ratio of the bandwidth of the one channel to the bandwidth of a subchannel configured for the STA.

18. The method according to claim 10, wherein the first region includes 64 Fast Fourier Transform (FFT)-based Orthogonal Frequency Division Multiplexing (OFDM) symbols, and the second region includes 256 FFT-based OFDM symbols.

* * * * *